US007920496B2

(12) United States Patent
Mahany et al.

(10) Patent No.: US 7,920,496 B2
(45) Date of Patent: Apr. 5, 2011

(54) TRANSACTION CONTROL SYSTEM INCLUDING PORTABLE DATA TERMINAL AND MOBILE CUSTOMER SERVICE STATION

(75) Inventors: Ronald L. Mahany, Cedar Rapids, IA (US); Steven E. Koenck, Cedar Rapids, IA (US); Alan G. Bunte, Cedar Rapids, IA (US); Robert C. Meier, Cedar Rapids, IA (US); Phillip Miller, Cedar Rapids, IA (US); Julie Ann Miller, legal representative, Cedar Rapids, IA (US); Roger L. Wolf, Lisbon, IA (US); George E. Hanson, Andover, KS (US)

(73) Assignee: Broadcom Corporation

( * ) Notice: Subject to any disclaimer, the term of this patent is extended or adjusted under 35 U.S.C. 154(b) by 0 days.

(21) Appl. No.: 12/715,991

(22) Filed: Mar. 2, 2010

(65) Prior Publication Data
US 2010/0167782 A1 Jul. 1, 2010

Related U.S. Application Data

(63) Continuation of application No. 12/258,267, filed on Oct. 24, 2008, now Pat. No. 7,672,257, which is a continuation of application No. 10/651,188, filed on Aug. 28, 2003, now Pat. No. 7,471,651, which is a continuation of application No. 08/499,328, filed on Jul. 7, 1995, now Pat. No. 6,654,378, which is a continuation-in-part of application No. 08/487,609, filed on Jun. 7, 1995, now Pat. No. 5,790,536, and a continuation-in-part of application No. PCT/US95/12628, filed on Dec. 23, 1993, said application No. 08/487,609 is a continuation-in-part of application No. 08/279,148, filed on Jul. 22, 1994, now Pat. No. 5,657,317, and a continuation-in-part of application No. 07/876,629, filed on Apr. 30, 1992, (Continued)

(51) Int. Cl.
*H04B 7/00* (2006.01)
(52) U.S. Cl. .............. 370/310; 235/472.02; 235/462.46; 455/41.2
(58) Field of Classification Search .................. None
See application file for complete search history.

(56) References Cited

U.S. PATENT DOCUMENTS
5,574,979 A * 11/1996 West ........................... 455/63.1
(Continued)

OTHER PUBLICATIONS
Rechter, IEEE Military Communications Conference, Conference Record vol. 1, "PLRS-JTIDS Hybrid (PJM) Satellite Overlay Concept", Oct. 21-24, 1984, pp. 280-283.

(Continued)

*Primary Examiner* — Ajit Patel
(74) *Attorney, Agent, or Firm* — McAndrews, Held & Malloy, Ltd.

(57) ABSTRACT

A mobile customer service station operating within a wireless multi-hop communication network includes a console on a wheeled chassis. The console carries and houses a number of components which are used in merchandising operations to conclude customer purchase transactions. The items supported externally on the console are a printer for printing purchase receipts, customer credit charge agreements and records of transactions, and a magnetic card reader for reading information from a magnetic stripe of a customer's credit card. In one embodiment, the operation of the printer, credit card reader and the cash drawer is controlled by a multifunction control unit located within an enclosure of the console. The control unit is electrically powered by a self-contained power source which is preferably a deep cycle rechargeable battery. The console also houses a transceiver unit which under the control of the control unit is capable of interactive communication with a premises network. In another embodiment, the mobile service station comprises an access device which participates with a variety of peripherals at the station in a lower power communication LAN, while providing higher power communication to other network devices via a premises network with routing via a wireless spanning tree configuration.

24 Claims, 11 Drawing Sheets

Related U.S. Application Data now abandoned, said application No. 08/279,148 is a continuation-in-part of application No. PCT/US94/05037, filed on May 6, 1994, and a continuation-in-part of application No. 08/205,639, filed on Mar. 4, 1994, now Pat. No. 5,555,276, and a continuation-in-part of application No. 08/275,821, filed on Jun. 10, 1994, now abandoned, said application No. 08/499,328 is a continuation-in-part of application No. 08/239,267, filed on May 6, 1994, now Pat. No. 6,006,100, which is a continuation of application No. 07/876,776, filed on Apr. 28, 1992, now abandoned, and a continuation-in-part of application No. 07/854,115, filed on Mar. 18, 1992, now abandoned, application No. 07/876,629, which is a continuation-in-part of application No. 07/854,115, filed on Mar. 18, 1992, now abandoned.

(56) References Cited

U.S. PATENT DOCUMENTS

| | | | |
|---|---|---|---|
| 6,526,277 B1 * | 2/2003 | Zicker et al. | 455/426.2 |
| 6,934,558 B1 * | 8/2005 | Sainton et al. | 455/552.1 |

OTHER PUBLICATIONS

Elden, IEEE Military Communications Conference, Conference Record vol. 1 of 3, "Survival Networks for the 21st Century TACS", Oct. 20-23, 1985, pp. 210-214.
De Pedro, et al., "IEEE Military Communications Conference, Conference Record vol. 1 of 3, Multimedia Networking Techniques to Enhance Communications Survivability", Oct. 20-23, 1985, pp. 308-312.
Rice, E.J., "IEEE Military Communications Conference," Oct. 5-9, 1986, Section 24.3.1-24.3.6.
Cummings, et al., Conference Record vol. 2 of 3, "A Mixed-Media Communications Architecture for Enhanced Interoperability", 1986.
Fernandez, IEEE Military Communications Conference, Conference Record vol. 1 of 3, "Architecture for Tactical C3 Systems Management", Oct. 19-22, 1987, Section 1.5.1-1.5.7.
Rafter, et al., IEEE Military Communications Conference, Conference Record vol. 3 of 3. "A Distributed Multiple Media Network Architecture", Oct. 15-18, 1989, Section 47.1.1-47.1.5.
Rafter, IEEE Military Communications Conference, Conference Record vol. 1 of 3, "Simulation and Performance of Multiple Media Networks for Tactical Communications", Sept. 30-Oct. 3, 1990, Section 13.5.1-13.5.4.
William, et al., Mobile Cellular Telecommunications: Analog and Digital Systems, Chapter 12, "Data Links and Microwaves", 1995, pp. 363-380.
Lessard, et al., IEEE Network, vol. 2, No. 3, "Wireless Communications in the Automated Factory Environment", May 1988, pp. 64-69.
Dr. Williams, et al., IEEE, "Air Logistics Center Local Area Networks", 1989, pp. 1276-1282.
Wence, et al., IEEE: "Breakthrough in Radio Technology Offers New Application Options", 1989, pp. 384-388.
Cochrane, et al., IEEE Communications Magazine, vol. 23, No. 10, "Latest Network Trends", Oct. 1985, pp. 17-31.
Leiner, et al., IEEE Communications Magazine, vol. 23, No. 3, "The DARPA Internet Protocol Suite", Mar. 1985, pp. 29-34.
Robertazzi, et al., IEEE Communications Magazine, vol. 24, No. 1, "Self-Organizing Communications Networks", Jan. 1986, pp. 28-33.
Parr, et al., IEEE Communications Magazine, vol. 23, No. 8, "Communications for Personal Computers", Aug. 1985, pp. 26-36.
Chien, et al., IEEE Communications Magazine, vol. 25, No. 6, "Cellular Access Digital Network (CADN): Wireless Access to Networks of the Future", Jun. 1987, pp. 22-31.
Boggs, et al., IEEE Transactions on Communications, vol. Com-28, No. 4, "PUP: An Internetwork Architecture", Apr. 1980, pp. 612-624.
Rosner, IEEE Transactions on Communications, vol. Com-28, No. 9, "An Integrated Distributed Control Structure for Global Communications", Sep. 1980, pp. 1505-1515.
Brick, et al., IEEE Transactions on Communications, vol. Com-28, No. 9, "Future Air Force Tactical Communications", Sep. 1980, pp. 1551-1572.
Shacham, IEEE Transactions on Communications, vol. Com-31, No. 2, "A Protocol for Preferred Access in Packet-Switching Radio Networks", Feb. 1983, pp. 253-264.
Green, IEEE Transactions on Communications, vol. Com-34, No. 3, "Protocol Conversion", Mar. 1986, pp. 257-268.
Jubin, et al., Proceedings of the IEEE, vol. 75, No. 1, "The DARPA Packet Radio Network Protocols", Jan. 1987, pp. 21-32.
Schacham, et al., Proceedings of the IEEE, vol. 75, No. 1, "Future Directions in Packet Radio Architectures and Protocols", Jan. 1987, pp. 83-99.
Tsuchiya, ACM, "An Architecture for Network-Layer Routing in OSI", 1988, pp. 185-190.
Epstein, et al., "Application of Commercial Wireless LAN Technology to Forward Area Mobile Communication", 1993, pp. 490-496.
Rustad, et al., IEEE Journal on Selected Area in Communications, vol. 8, No. 5, "New Radio Networks for Tactical Communication", Jun. 1990, pp. 713-727.
Schoening, et al., U.S. Government, "Soldier Radio", Section 20.1.1-20.1.3.
Kanterakis, et al., IEEE, "Soldier's Radio: Innovative Communication and Networking Technologies for the Individual Warrior", 1994, pp. 347-354.
Brendler, IEEE Communications Magazine, "Tactical Military Communications", Jan. 1992, pp. 62-72.
Brothers, Jr., et al., IEEE, "Wireless Distributed Multimedia Communications Networks for the Digital Battlefield", 1996, pp. 349-356.
Woolnough, EETimes, "Britain Offers Digital Cordless Phone Service", Dec. 14, 1987.
Motorola, SN249041, DNYA TAC Cellular Mobile Telephone, Instruction Manual, 68P81049E55, Feb. 4, 1983.
War Department Technical Manual, TM 11-242, Radio Set SCR-300-A, Feb. 26, 1945.
Qualcomm's Memorandum of Points and Authorities in Support of Its Motion for Summary Judgment of Invalidity of Claims 8-11 and 13 of U.S. Patent No. 6,359,872 (Sep. 8, 2006).
Qualcomm's Memorandum of Points and Authorities in Support of Its Motion for Summary Judgment of Invalidity of Claim 2 of U.S. Patent 5,682,379 (Sep. 8, 2006).
Broadcom's Corrected Opposition to Qualcomm's Motion for Summary Judgment of Invalidity of Claim 2 of U.S. Patent No. 5,682,379 (Oct. 25, 2006).
Broadcom's Corrected Opposition to Qualcomm's Motion for Summary Judgment of Invalidity of Claims 8-11 and 13 of U.S. Patent No. 5,369,872 (Oct. 25, 2006).
Qualcomm's Reply in Support of Its Motion for Summary Judgment of Invalidity of Claim 2 of U.S. Patent No. 5,682,379 (Nov. 13, 2006).
Qualcomm Opposition to Broadcom's Cross-Motion for Summary Judgment on Effective Filing Data of U.S. Patent Nos. 5,682,379 and 6,359,872 (Nov. 13, 2006).
Qualcomm's Reply in Support of Its Motion for Summary Judgment of Invalidity of Claims 8-11 and 13 of U.S. Patent No. 6,359,872 (Nov. 13, 2006).
Supplemental Expert Report of Stephen G. Kunin, Jan. 20, 2006.
Qualcomm Incorporated's Sixth Supplemental Objections and Responses to Complainant's First Set of Interrogatories (Nos. 1-15), Dec. 9, 2005.
Qualcomm Incorporated's Responses and Objections to Broadcom Corporation's First Set of Interrogatories (Nos. 1-31), Jul. 17, 2006.
Qualcomm Incorporated's Supplemental Responses and Objections to Broadcom Corporation's First Set of Interrogatories (Nos. 1-31), Aug. 28, 2006.
Qualcomm Incorporated's Second Supplemental Responses and Objections to Broadcom Corporation's First Set of Interrogatories (Nos. 1-31), Sep. 15, 2006.
McNamara, "Technical Aspects of Data Communication", Digital Press, 3rd Edition, 1988.

The Bluetooth SIG: General Information & Membership Benefits, Bates Nos. QBB029818-19531, Apr. 2003.
Acceptance of Associates Membership by Qualcomm, Includes Bluetooth SIG Application for Membership, Bates Nos. QBB029479-29482, Aug. 8, 2001.
MSM Overview & Data Sheets: Overview only—MSM7600, 7500, 7200 & 6125: Overview & Data Sheets—MSM6800, 6500, 6300, 6280, 6274, 6260, 6255, 6250, 6225, 6200, 6100, 6050, 6025, & 6000.
Specifications of the Bluetooth System, PROFILES, Specification vol. 2, Version 1.1, Feb. 22, 2000.
Hands-Free Profile Adopted Version 1.0, Apr. 20, 2003 QBB 729883-719955.
Specification of the Bluetooth System, PROFILES, Specification vol. 2, v1.0B, Dec. 1, 1999.
Gollnick Deposition Transcript, Oct. 27, 2005.
Bunte Deposition Transcript, Oct. 28, 2005.
Luse Deposition Transcript, Nov. 17, 2005.
Steven Koenck Deposition Transcript, Nov. 15, 2005.
Expert Report Concerning U.S. Patent Nos. 5,682,379 and 6,359,872 by Professor Stuart C. Schwartz.
Posthearing Brief of the Commission Investigative Staff, United States International Trade Commission, Apr. 3, 2006.
"Automation in Warehouse", Proceedings of the 8th International Conference, Tokyo, Japan, Oct. 2006-Aug. 1987, pp. 1-355.
"Supporting Research and Advanced Development", NASA Space Programs Summary 37-48, vol. III, Jet Propulsion Laboratory, Dec. 31, 1967, pp. 1-291.
U.S. Appl. No. 07/699,818—file history.
U.S. Appl. No. 07/700,704—file history.
U.S. Appl. No. 07/982,292—file history.
U.S. Appl. No. 07/997,693—file history.
U.S. Appl. No. 08/027,140—file history.
U.S. Appl. No. 08/500,977—file history.
U.S. Appl. No. 08/959,432—file history.
U.S. Appl. No. 07/553,438—file history.
U.S. Appl. No. 07/716,707—file history.
U.S. Appl. No. 10/101,436—file history.
U.S. Appl. No. 10/458,597—file history.
U.S. Appl. No. 07/876,776—file history.
U.S. Appl. No. 07/854,115—file history.
U.S. Appl. No. 07/558,895—file history.
U.S. Appl. No. 07/529,353—file history.
Claim Construction Order for '872 Patent, and Court's Claim Construction, May 1, 2006.
Claim Construction Order for '379 Patent, and Court's Claim Construction, May 1, 2006.
NASA Technical Note, NASA TN D-6974, Apollo Experience Report—Lunar Module Communications Systems, Sep. 1972.
NASA, Apollo Program Summary Report, JSC-09423, TM-X-68725, Apr. 1975.
Nasa, Apollo 17 Press Kit, Release No. 72-220K, Nov. 26, 1972.
Maj. Ondo, "Field Artillery Journal: PLRS/JTIDS Hybrid", Jan.-Feb. 1981, pp. 20-26.
Proffitt, 36th IEEE Vehicular Technology Conference, "The Portable Cell Site", May 20-22, 1986, pp. 291-300.

* cited by examiner ly related applications, including application
Ser. No. 07/876,776, filed Apr. 28, 1992 (the continuation of
which has been published as U.S. Pat. No.6,006,100), and
PCT application Ser. No. PCT/US92/08610, filed Oct. 1,
1992, as published under International Publication No. WO
93/07691, on Apr. 15, 1993, together with U.S. Pat. Nos.
5,031,098, 5,052,020, 5,202,825, 5,349,678, 5,365,546,
5,568,645, 5,070,536, by Mahany et al., U.S. Pat. No. 4,924,
462, by Sojka, and U.S. Pat. No. 4,910,794, by Mahany, are
incorporated herein by reference in their entirety, including
drawings and appendices, and hereby are made a part of this
application.

TRANSACTION CONTROL SYSTEM INCLUDING PORTABLE DATA TERMINAL AND MOBILE CUSTOMER SERVICE STATION

CROSS REFERENCE TO RELATED APPLICATIONS

Claiming Benefit Under 35 U.S.C. 120

This application is a continuation of U.S. application Ser. No. 12/258,267, filed Oct. 24, 2008, now U.S. Pat. No. 7,672, 257, which is a continuation of U.S. application Ser. No. 10/651,188, filed Aug. 28, 2003, now U.S. Pat. No. 7,471, 651, which is a continuation of U.S. application Ser. No. 08/499,328, filed Jul. 7, 1995, now U.S. Pat. No. 6,654,378, which is a continuation-in-part of U.S. application Ser. No. 08/487,609, filed Jun. 7, 1995, now U.S. Pat. No. 5,790,536, issued Aug. 4, 1998. U.S. application Ser. No. 08/499,328 is also a continuation-in-part of PCT application Ser. No. PCT/US93/12628, filed Dec. 23, 1993.

The application U.S. Ser. No. 08/487,609, filed Jun. 7, 1995 is a continuation-in-part of U.S. application Ser. Nos.: a) 08/279,148, filed Jul. 22, 1994, now U.S. Pat. No. 5,657,317, issued Aug. 12, 1997; and b) 07/876,629, filed Apr. 30, 1992, now abandoned.

The application U.S. Ser. No. 08/279,148, is a continuation-in-part of PCT application Ser. No. PCT/US94/05037, filed May 6, 1994; U.S. application Ser. No. 08/205,639, filed Mar. 4, 1994, now U.S. Pat. No. 5,555,276, and U.S. application Ser. No. 08/275,821, filed Jun. 10, 1994, now abandoned.

PCT application Ser. No. PCT/US94/05037 is based on U.S. application Ser. No. 08/198,404, filed Feb. 22, 1994, now abandoned, which is itself a continuation of U.S. application Ser. No. 08/198,452, filed Feb. 18, 1994, now abandoned, which is in turn a continuation-in-part of U.S. application Ser. No. 08/168,478, filed Dec. 16, 1993, now abandoned, and PCT application Ser. No. PCT/US93/12628, filed Dec. 23, 1993. The application U.S. Ser. No. 08/168, 478, is a continuation-in-part of U.S. application Ser. No. 08/147,377, filed Nov. 3, 1993, which is a continuation-in-part of U.S. application Ser. No. 08/101,254, filed Aug. 3, 1993, now abandoned, which is itself a continuation-in-part of U.S. application Ser. No. 08/085,662, filed Jun. 29, 1993, now abandoned, which is itself a continuation-in-part of U.S. application Ser. No. 08/076,340, filed Jun. 11, 1993, now abandoned, which is in turn a continuation-in-part of U.S. application Ser. No. 08/062,457, filed May 11, 1993, now abandoned.

PCT application Ser. No. PCT/US93/12628 is based on U.S. application Ser. No. 08/027,140, filed Mar. 5, 1993, now U.S. Pat. No. 5,602, 824, issued Feb. 11, 1997,which is itself a continuation-in-part of U.S. application Ser. 07/997,693, field Dec. 23, 1992, now abandoned, which is a continuation-in-part of U.S. application Ser. No. 07/982,292, filed Nov. 27, 1992, now abandoned.

U.S. application Ser. No.08/499,328 is also a continuation-in-part of U.S. application Ser. No. 08/239,267, filed May 6, 1994, now U.S. Pat. No. 6,006,100, issued Dec. 21, 1999, which is a continuation of U.S. application Ser. No. 07/876, 776, filed Apr. 28, 1992,now abandoned. U.S. application Ser. No. 08/239,267 is also a continuation-in-part of U.S. application Ser. No. 07/854,115, filed Mar. 18, 1992,now abandoned.

U.S. application Ser. No. 07/876,629, filed Apr. 30, 1992is also a continuation-in-part of U.S. Ser. No. 07/854,115, filed Mar. 18, 1992, now abandoned.

INCORPORATION BY REFERENCE

The above-referenced applications, including application Ser. No. 07/876,776, filed Apr. 28, 1992 (the continuation of which has been published as U.S. Pat. No.6,006,100), and PCT application Ser. No. PCT/US92/08610, filed Oct. 1, 1992, as published under International Publication No. WO 93/07691, on Apr. 15, 1993, together with U.S. Pat. Nos. 5,031,098, 5,052,020, 5,202,825, 5,349,678, 5,365,546, 5,568,645, 5,070,536, by Mahany et al., U.S. Pat. No. 4,924, 462, by Sojka, and U.S. Pat. No. 4,910,794, by Mahany, are incorporated herein by reference in their entirety, including drawings and appendices, and hereby are made a part of this application.

BACKGROUND OF THE INVENTION

1. Field of the Invention

This invention relates generally to wireless, computer controlled transaction processing within merchandising operations, and, more particularly, it relates to a communication network wherein much of such transaction processing is distributed between a centralized station and a plurality of portable data terminals 2. Description of the Related Art Computer terminals and peripherals have become dramatically smaller and more portable. Many types of peripheral devices exist such as printers, modems, graphics scanners, text scanners, code readers, magnetic card readers, external monitors, voice command interfaces, external storage devices, and so on. Despite the reductions in size, computer terminals still must physically interface with the peripheral devices. This typically involves either the running of a cable from one of the computer terminal to each device (hereinafter "hard-wiring") or the computer terminal must be docked with the device while the information transfer is to take place.

Hard-wiring poses several problems. If there are many peripheral devices, there must be as many cables attached to the computer terminal. This place a strain on the input/output capabilities of many computer devices. In addition, the wired mass of cabling often creates an eyesore and safety hazard. In addition, attempts to hide cabling behind walls often proves very costly, and such hidden wires are always more difficult to relocate.

Another problem exists when several computer terminals share a peripheral device. Not only must each computer be connected, often via hard-wiring, to the peripheral device, but it must utilize a communication protocol for sharing the communication channel to the peripheral device with the other connected computer terminals. This poses significant problems with different types of computers that do not share a common hard-wired interface or communication protocol.

In smaller computer terminal settings, hand-held or portable terminals, the cabling and connection problem become more severe. For example, excess cabling can transform an otherwise light, portable device into either a stationary device or a heavy, luggable device having dangerous trip cords for cabling.

Physical connections created by hard-wiring often proves to be relatively expensive because cables break and must be replaced. Cable replacement is even more common in portable environments where cables are subject to frequent handling, temperature extremes, dropping and other physical trauma.

An operator who is using, holding or carrying several devices and feels all tied up is not just inconvenienced, he may be severely limited in his mobility and flexibility as he moves about the work area. This loss of mobility and flexibility directly undercuts the entire reason for having small and portable computers and peripheral devices, and greatly increases the likelihood of operator injury.

Attempts to alleviate or eliminate these problems have been made but have not been greatly successful. One solution is to incorporate a computer terminal and all of the peripherals into one unit. However, this solution proves unsatisfactory for several reasons. For example, the incorporation of many devices into one unit greatly increases the size and weight, thus jeopardizing the portability of the unit. Furthermore, incorporating all of the functions into one unit greatly reduces and, in most cases eliminates, the flexibility of the overall system. A user may only wish to use a hand-held computer terminal at times, but at other times may also need to use a printer or occasionally a code reader. An all-incorporated unit thus becomes either overly large because it must include everything, or very limiting because it does not include everything.

Another solution has been to set up Local Area Networks (LAN's) utilizing various forms of RF (Radio Frequency) communication. The LAN's to date, however, have been designed for large scale wireless communications between several portable computer terminals and a host computer. Therein, the host computer, itself generally a stationary device, manages a series of stationary peripherals that, upon requests to the host, may be utilized by the portable terminals.

Other large scale wireless communications have also been developed which for RF communication between several computer terminals and peripheral devices, but all proving to be ineffective as a solution. For example, these systems require the peripheral devices to remain active at all times to listen for an occasional communication. Although this requirement may be acceptable for stationary peripheral devices receiving virtually unlimited power (i.e., when plugged into an AC outlet), it detrimental to portable peripherals by unnecessarily draining battery power. Similarly, in such systems, the computer terminals are also required to remain active to receive an occasional communication not only from the other terminals or the host but also from the peripherals. Again, often unnecessarily, battery power is wasted.

Moreover, in merchandising operations, conventional, stationary merchandizing terminals (e.g., electronic cash registers) which are typically hard-wired to a power source, local communication network, and/or telephone lines provide customer checkout service at a fixed location. Once such terminals are installed, they cannot be easily moved without significant effort in not only moving the terminals themselves but also in the relocation of the power source (typically an AC outlet), communication network and telephone line connections.

Also in merchandising operations, a common problem is found in handling light and heavy checkout loading. To manage heavy customer checkout traffic, each merchandiser, guessing what the peak checkout traffic will be, installs a plurality of stationary merchandizing terminals within a store's premises. If the guess proves too low, additional stationary terminals (each requiring power source, network and telephone connection, i.e., cabling installations) must be added, often causing floor layout problems and very expensive cabling installations which require the store to be temporarily closed. Alternately, if the guess proves too high, a merchandiser must either rip out the station and repair the facilities or suffer the costs of lost space and station upkeep. Furthermore, increases or decreases in customer traffic over time may covert a guess for good to bad, resulting in the need to modify a store's terminal installations.

In addition, in periods of light checkout traffic (i.e., very few customers checking out in relation to the number of stationary merchandizing terminals), most of the stationary merchandising terminals will not be used. In such situations, the space taken up by the stationary terminals is not justified. In periods of heavy checkout traffic (i.e., where numbers of customers wait in lines for access to each available stationary merchandising terminal), merchandisers fear that their customers will see the lines and forego their purchases, or, worse, will become so dissatisfied with the checkout wait that they will vow never to return.

Thus, it may be appreciated that it is often very difficult to predict the number of stationary merchandizing terminal installations that are or will be needed. Moreover, it is even more difficult and costly to change a store's stationary merchandizing terminal installations to conform to such needs.

Attempts have been made to minimize the cost of removing or adding merchandizing terminal installations by replacing the network cabling with an RF communication channel. In such installations, each terminal is fitted with an RF transceiver for communicating, for example, with a centralized host computer located some distance away. However, even with such changes, the aforementioned problems have not been solved. For example, the merchandising terminals still require hard-wiring to a power source, telephone lines (if used) and peripherals. In addition, the RF transmissions used to communicate with the centralized host need relatively high transmission power, requiring access to a virtually unlimited power source (such as is available through an AC outlet).

Thus, there is a need for a communication network that supports the changing need for merchandizing terminals and their peripherals without requiring conventional removal, installation or relocation costs.

SUMMARY OF THE INVENTION

The present invention solves the foregoing problems in a longer range communication network having a mobile service station comprising a plurality of network devices. One of the plurality of network devices is an access point device which is capable of communicating on the longer range communication network. The plurality of network devices together form a shorter range communication network operating as a subnetwork in the longer range communication network. The access point device may enter a low power consumption state when it is not communicating on either the longer range communication network or the shorter range communication network.

In another embodiment, the access point device participates as a slave device to the longer range communication network pursuant to a first communication protocol, and participates as a master device to the shorter range communication network pursuant to a second communication protocol. The access point device may resolve conflicts between the first and second communication protocols.

In a further embodiment, a communication system comprises a wireless premises network and a wireless peripheral subnetwork having a relatively shorter range than the wireless premises network. The system further has a mobile network device capable of communicating with both the wireless premises network and the wireless peripheral subnetwork, as well as a mobile service station. The mobile service station has a battery power supply, and is configured to mount the mobile network device. The mobile network device may participate on the peripheral subnetwork when mounted on the mobile service station.

When within the relatively shorter range of the peripheral subnetwork, the mobile network device participates on the peripheral subnetwork. When within range of the wireless premises network, the mobile network device may participate on the wireless premises network. Furthermore, the mobile service station may mount a peripheral device which participates on the peripheral subnetwork.

The mobile network device may participate as a slave device to the wireless premises network pursuant to a first communication protocol while participating as a master device to the peripheral subnetwork pursuant to a second communication protocol. The mobile network device resolves conflicts between the first and second communication protocols. When not communicating with either the wireless premises network or the peripheral subnetwork, the mobile network device may enter a state of low power consumption.

In a still further embodiment, the wireless premises network has a first plurality of network devices, and the peripheral subnetwork also has a second plurality of network devices. When within range of one of the second plurality of network devices, the mobile network device participates as a master device in the peripheral subnetwork, and when within range of one of the first plurality of network devices, the mobile network device participates as a slave device in the wireless premises network.

In yet another embodiment, the system has a network device independent of the mobile network device. The network device has means for identifying a range value which indicates the distance between the network device and the mobile network device. The network device responds to the identifying means by transmitting the range value to the mobile network device, and, when the mobile network device receives the range value, the mobile network device identifies an appropriate data rate for subsequent transmission to the network device. Alternatively, the network device may respond to the identifying means by instead indicating to the mobile network device an appropriate rate for subsequent data transmission to the network device. In addition, the mobile network device may have means for identifying battery parameter information which may be used along with the range value received from the network device to identify an appropriate power level and data rate for subsequent transmission to the network device.

In another embodiment, the communication system is used to facilitate a transaction. The communication system comprises a mobile service station operating on a first communication network. The mobile service station has a network device for capturing transaction information, and for generating therefrom code information representative of the transaction information. The mobile service station further comprises a code printer for printing the code information in code form. The system also has a host service station operating on a second communication network. The host service station comprises a second network device for reading the code and for generating therefrom the code information. The second network device converts the code information into the transaction information which the code information represents.

DETAILED DESCRIPTION OF THE INVENTION

Figure 1:
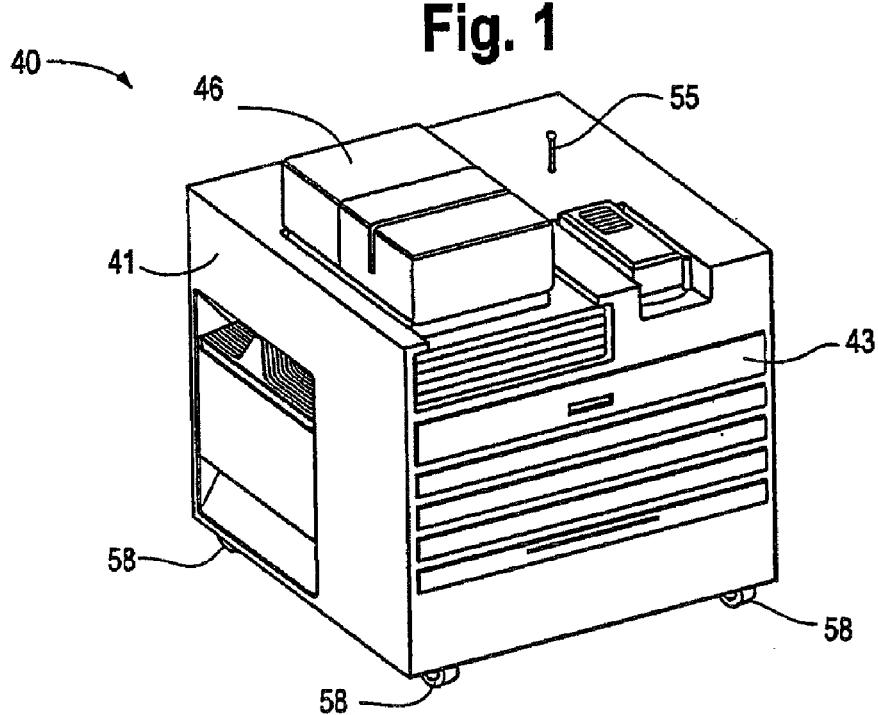
FIG. 1 is a perspective diagram illustrating a mobile customer service station built in accordance with the present invention.

FIG. 1 is a perspective diagram illustrating a mobile customer service station built in accordance with the present invention. The devices found in the illustrative peripheral LAN are battery powered and therefore must conservatively utilize their radio transceivers. The arrangement of the communication network, communication protocols used, and data rate and power level adjustments help to optimize battery conservation without substantially degrading network performance.

In the embodiment illustrated in FIG. 1, the station 40 comprises a radio transceiver 47 (having an antenna 55), the cash drawer 43, and the multi-station printer 46. Other components, such as the battery 45 and the multi-function control unit 42 are mounted within a housing or an enclosure 56 of the console 41. The enclosure 56 is mounted, in turn, to a wheeled base or chassis 57 which serves as a component mounting structure of the console 41 of the customer service station 40.

The enclosure 56 desirably houses such electrical components that are desirably not accessible and supports other components of the customer service station which need to be accessed or be otherwise exposed For example, because the transceiver need not be accessed by an operator, yet the antenna 55 desirably remains exposed for optimum functional range. Thus in the currently preferred arrangement of the various components of the mobile customer service station 40, the transceiver 47 is visible only by its antenna 55. The multi-station printer 46 is preferably placed on top of the enclosure 56 for ready access by a clerk. The cash drawer 43 is accessible and mounted to slide open horizontally. Other components, such as the battery 45 and the multi-function control unit 42 are housed within the enclosure 56 and are consequently not visible. Wheels 58 allow the customer service station 40 to be readily moved about by pushing or pulling it. It should be understood that various changes and modifications particularly in the placement of the components are possible without departure from the spirit and scope of the invention. Also, while it is deemed possible within the scope of the invention to apply power to the wheels 58 and thereby provide a self-propelled unit, these modifications are not contemplated at this time.

Figure 2:
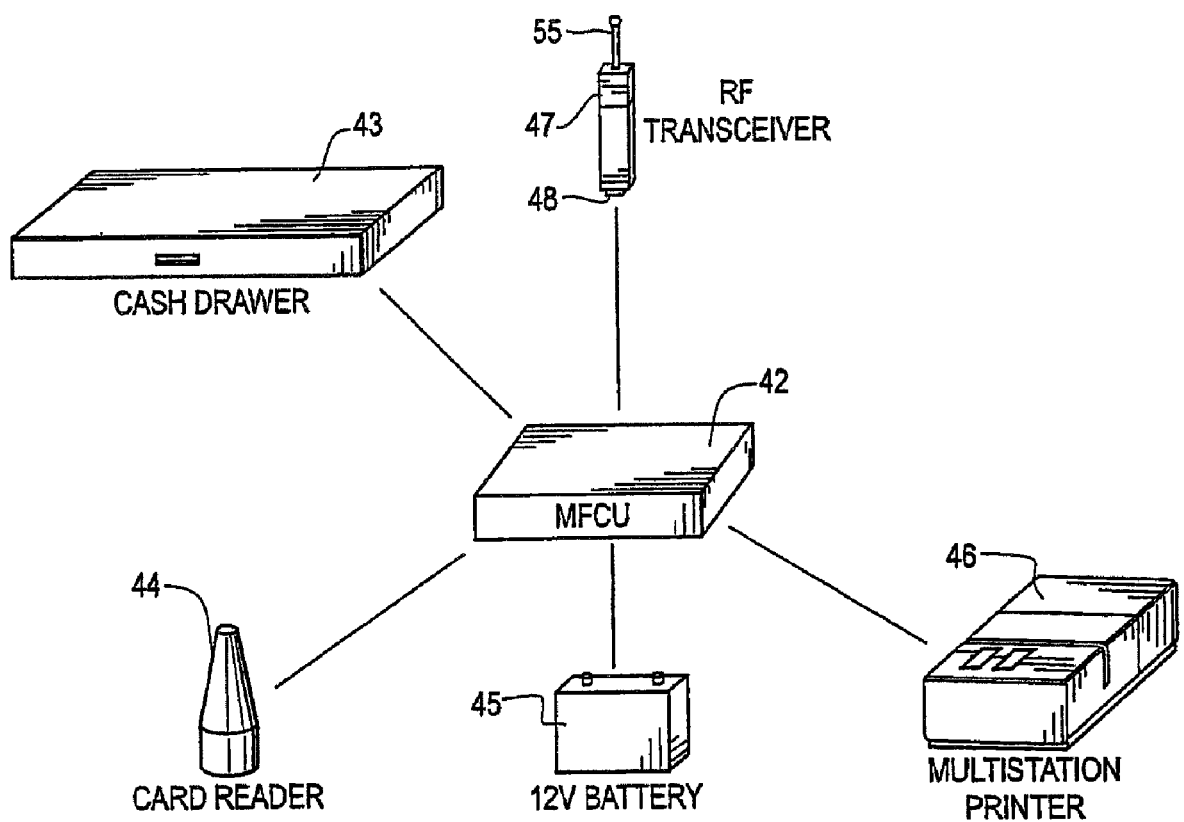
FIG. 2 is a schematic representation of features of one embodiment of the customer service station of FIG. 1, showing particularly elements housed in or mounted to a mobile enclosure.

FIG. 2 is a schematic representation of features of one embodiment of the customer service station of FIG. 1, showing particularly elements housed in or mounted to a mobile enclosure. Specifically, a multi-function control unit 42 ("MFCU"), provides local control functions for the customer service station 40 and provides radio communications, as for example with the communications controller 31 in FIG. 1. In the preferred embodiment the customer service station 40 further includes a cash drawer 43 which, of course, is used for storing cash and customer-signed credit authorizations. A card reader 44 allows a customer's credit card information to be read when a customer has selected to charge payments for purchased items to a credit card account. Typically credit cards contain magnetic stripes bearing magnetically encoded information relating to the customer. Data read by the card reader consequently may include the card number, an account number, possibly account status information, and such data may furthermore include a personal identification of the user. These data need to be interpreted. According to the preferred embodiment the card reader is a model 40 Magstripe reader, as sold by American Magnetics. Of course, other readers may be equally feasible. The reader is not contemplated to include circuitry for the interpretation of data read from a card. Instead, the interpretation of data read from a card will be performed by the control unit 42.

A self-contained power source, such as a rechargeable battery 45 is contemplated to power all electrical functions of the customer service station 40 for the duration of each contemplated period of usage to permit the customer service station to maintain the mobility or independence of customer service station 40 from conventional power outlets. It should be realized that, alternatively, mobile electronic equipment may be powered by transformer-type power supplies in temporary substitutions for batteries. Such alternate power sources typically do not require extensive hardwiring of the equipment to which they are applied. Thus, within the intent of this invention such alternate power sources are somewhat self-contained and should be considered to lie within the realm of reasonable changes and modifications within the scope of the invention. The battery is preferred to be a 12 volt deep cycle type battery. Depending on the type of usage of the equipment contemplated to be included as part of the customer service station 40, the battery size is selected to fully power all selected functions for the duration of the longest contemplated period of usage. The correctly selected battery size will allow the battery 45 to be charged during idle periods, such as during store closing hours. The customer service station 40 will then be ready for use during the following business day.

A printer 46 is selected for low power usage in support of the mobility of the customer service station. The printer is intended to print customer receipts and may be used to print customer credit authorizations to be retained by the store. A printer typically is a mechanical motion device requiring more power for its operation than other, non-motion devices, such as computers or the card reader 44, for instance. An exemplary printer that satisfies these needs can be obtained from NCR Corporation (model number 7150) although various others might also be used.

A radio transceiver 47 functions as a transmitting and receiving unit for the mobile customer service station 40. In a preferred embodiment of the customer service station 40, the transmitting and receiving functions of the transceiver 47 are separated from the functions of encoding and decoding radio messages. The transmitting and receiving functions are separately housed in the transceiver 47 itself, while the coding and decoding functions reside in and are part of the multi-function control unit 42, similar to the separation of the base transceiver station 32 and the communications controller 31. A connector 48 is located at the base of the transceiver 47 for electrically coupling the transceiver 47 to the multi-function control unit 42. Thus, in such embodiment the radio transceiver 47 is like the base transceiver station 32 of the radio communications system 21, such that the two units are interchangeable. The radio transceiver is coupled to the multi-function control unit 42 which performs all communications functions within the customer service station 40 other than the functions of receiving and transmitting radio messages.

Figure 3:
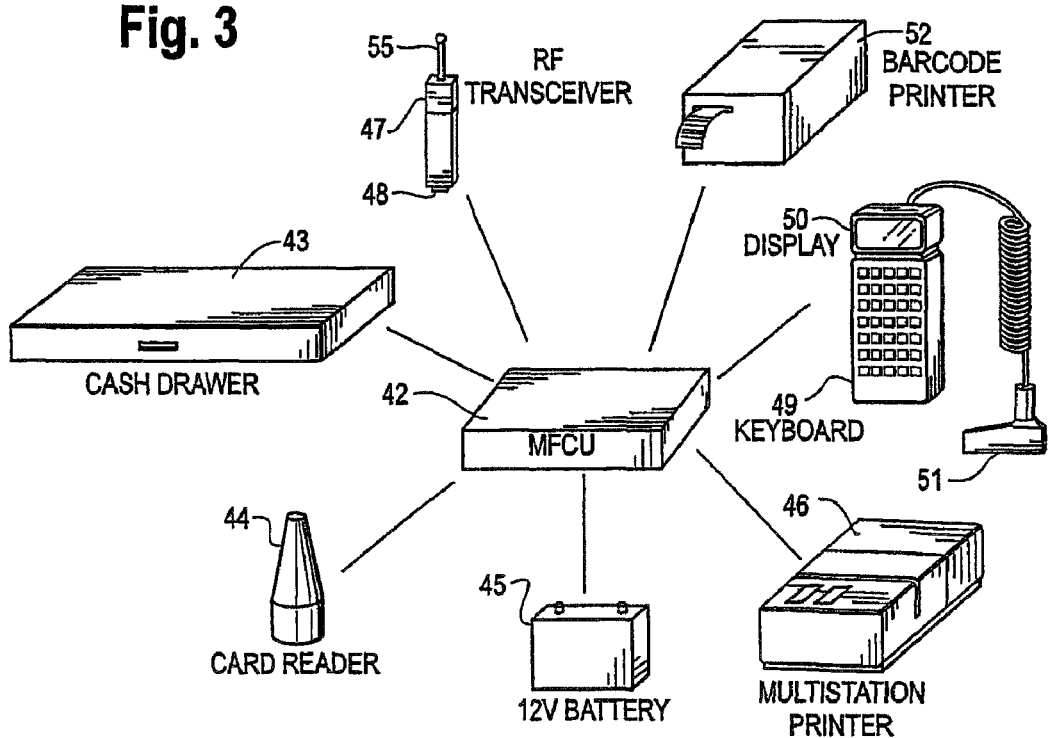
FIG. 3 is a schematic representation of features of an alternate embodiment showing elements housed in or mounted to the mobile customer service station of FIG. 1.

FIG. 3 is a schematic representation of features of an alternate embodiment showing elements housed in or mounted to the mobile customer service station of FIG. 1. In addition to the components described with respect to the preferred embodiment of the customer service station 40, the alternative embodiment thereof further includes a keyboard 49 a display 50, such as a typical video screen, liquid crystal or an LED display with alpha-numerical character modes, and a bar code reader 51. A bar code printer 52 may be desirable for providing certain customer service functions different from the typical function of tallying purchased items in a standard check-out operation.

The keyboard 49 is preferred to be an alphanumeric keyboard for entering computer queries and customer information in addition to typical SKU numbers. The display 50 is coupled to the keyboard 49 and to the multi-function control unit 42 and is consequently capable of showing data received from either the keyboard 49 or the control unit 42. The data communication connection between the control unit 42 and the display 50 is bi-directional, thereby providing for interactive communication between an operator of the keyboard 49 via the display 50 with the multi-function control unit 42. In this interactive mode the control unit 42 reads data from the display 50 or from the keyboard 49, and has the capability to output data or information to the display 50. The bar code reader 51 is preferably coupled to the display 50, and data read by the bar code reader 51, for example, from merchandise identification tags or from customer courtesy cards or the like, are stored and displayed by the display 50. The multi-function control unit 42 has, of course, access to data stored in the display 50 through the referred-to bi-directional data link between the control unit 42 and the display 50.

The bar code printer 52 is a typical, commercially available bar code printer. Typically one would not desire to include a bar code reader on a customer check-out station, however, it is advantageous to use the printer 52 for printing merchandise labels for special sales or when standard merchandise labels are defective or missing. In special sales situations, the bar code printer 52 is used to print special sales labels which are then applied to specially discounted items of merchandise to permit such items to be readily identified. Label printing for merchandise items may also be performed in line with genera merchandise restocking operations. The bar code printer 52, consequently, serves to further expand the usefulness of the mobile customer service station 40.

Figure 4:
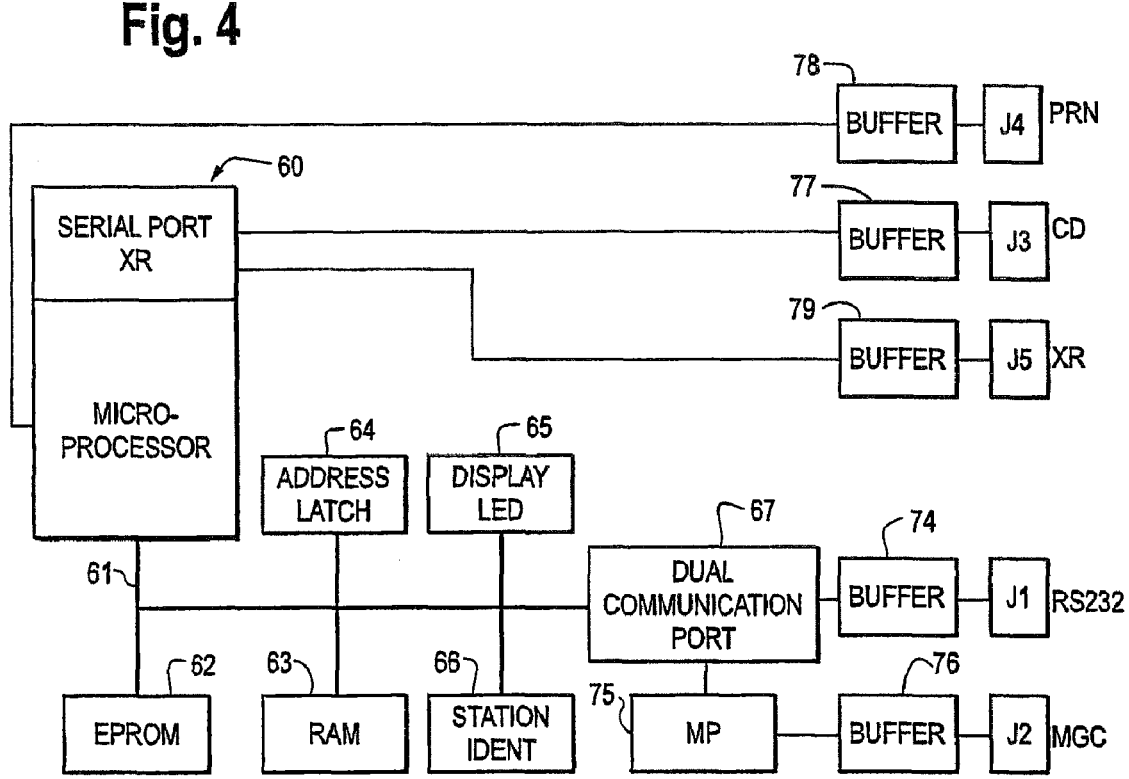
FIG. 4 is a schematic block diagram of a multi-function control unit shown in FIGS. 2 and 3.

FIG. 4 is a schematic block diagram of a multi-function control unit shown in FIGS. 2 and 3. In essence, the multi function control unit serves the major functions of controlling the operation of the components of the customer service station 40, and providing radio communications with the communications controller 31.

A microprocessor 60 is shown to interact with several functional subcircuits via a control and data communications bus 61. As is often the case, the microprocessor 60 interacts with an EPROM 62 (an electrically programmable read only memory) and a RAM 63 (a random access memory) in a typical manner. The EPROM 62 is initially programmed to store a control program to be accessed by the microprocessor 60. The control program causes the microprocessor 60 to generate control codes in a predetermined manner to control all functions to be exercised by the customer service station 40. Thus, the program stored in the EPROM 62 establishes sequences and priorities between different operating functions known as a controller protocol. The RAM 63 temporarily stores data, which data may be either procedural or substantive. procedural data are address codes, status information on a currently active component of the customer service station, or information indicating operating sequences. Substantive data are, for example, data concerning customer information, SKU numbers of purchases made by a respective customer, and price and quantity information.

An ADDRESS LATCH 64 latches or locks in the address of a current memory address.

A status display 65 is an LED indicator, preferably showing four digits, which indicates visually an alphanumeric status report of the operation of the customer service station 40. Thus, an operator may receive a trouble report in case of a malfunction. In a normal mode the currently active component of the customer service station 40 may be indicated.

A station identifier circuit 66 generates a code which, when incorporated into a time-slot encoded radio transmission data message, identifies which particular customer service station 40 has originated a particular radio transmission data message in question.

A dual communications port 67 is a serial communications port. The communications port temporarily stores data in data registers for transfer as a data stream into a serial interface, or the port 67 receives data in serial format and stores such data temporarily in such data registers for immediately subsequent data transfer to the microprocessor 60, for example.

The multi-function control unit 42 includes in the embodiment shown in FIG. 4, five electrical connectors which serve as external connections or interface ports between the control unit 42 and the respective component as pointed out herein below.

The connectors are labeled J1 through J5. The connector J1 is a general purpose serial interface, generally known as an RS232 port. The J1 connector is in essence an auxiliary port, in that the customer service station per FIG. 2 shows no connection with respect to the connector J1. However, the display 50 or in the alternative, the bar code printer 52 is contemplated to be connected to the serial port J1. Data communication between the dual communication port 67 and any device externally connected to the connector J1 is buffered through a typical buffer circuit 74.

The connector J2 establishes a connection between the magnetic card reader 44 and the multi-function control unit 42. In reference to FIG. 4, the data received from the card reader are raw data and are interpreted by a programmed microprocessor 75 in combination with a data buffer 76. The interpreted data are then applied to the dual communication port 67.

The connector J3 is the interface for the cash drawer 43. A command to open the cash drawer is issued directly from the microprocessor 60 as a result of a respective data message received thereby. An amplifier-driver circuit 77, also referred to as a buffer, adapts the signal from the microprocessor 60 to be recognized by the cash drawer 43.

The connector J4 is a printer interface and is matched to a parallel interface of the preferred multi-station printer 46. The data and hand-shake signals are applied by the microprocessor 60 to a buffer 78 and from there directly to the connector J4.

The connector J5 is a mating communications connector for the connector 48 and is preferably disposed to readily permit the radio transceiver 47 to be interconnected with the multi-function control unit 42. The connector J5 is hence the port to the radio communications system 21 as shown below in FIG. 6. The diagram of FIG. 4 shows the microprocessor 60 as supporting serial transmit-receive functions. The microprocessor 60 provides through the respective serial XR input-output terminals the coding and decoding functions for the time-slot multiplexing procedure referred to above. Because of critical timing relationships, the encoding and decoding functions are preferred to be performed directly by the microprocessor. The signal generated by the microprocessor 60 is then transferred through a single buffer 79 and through the connector J5 to the radio transceiver 47. All transmissions received by or transmitted from the mobile customer service station 40 are, consequently, encoded to uniquely identify the particular data in such radio data messages with a particularly coded terminal 33.

Thus, to infuse one or more of the mobile customer service stations 40 into the radio communications system 21, a corresponding number of the potentially addressable data terminals 33 are deactivated and the respective customer service stations 40 are substituted to take the place of the deactivated data terminals 33. To establish correct identification of the respective customer service stations 40, each of the multi-function control units 42 must have stored the address code that corresponds to the address code of one of the deactivated data terminals 33.

From the above-described method of substituting the customer service stations 40 it becomes apparent that the number of substitutions cannot exceed the maximum number of available radio address codes within any given system. Thus, within the described limits of this embodiment of the present invention, the maximum number of substituted customer service terminals would be sixteen.

In accordance with one method of using the mobile customer service stations 40 as mobile stations of the transaction control system 10, a number of substitutions of customer service stations 40 for what would otherwise be radio addresses for the data terminals 33 is less than the total possible number of substitutions for the following reasons.

In accordance herewith, the data terminals 33 are considered data entry terminals for the mobile customer service stations 40. To achieve such mode of operation, the communications protocol lodged in the central computer 11 can be modified to establish communication between a respective one of the data terminals 33 and one of the mobile customer service stations. A number of operational variations will be discussed below which affect the operational sequence and hence the protocol in the computer.

Figure 5:
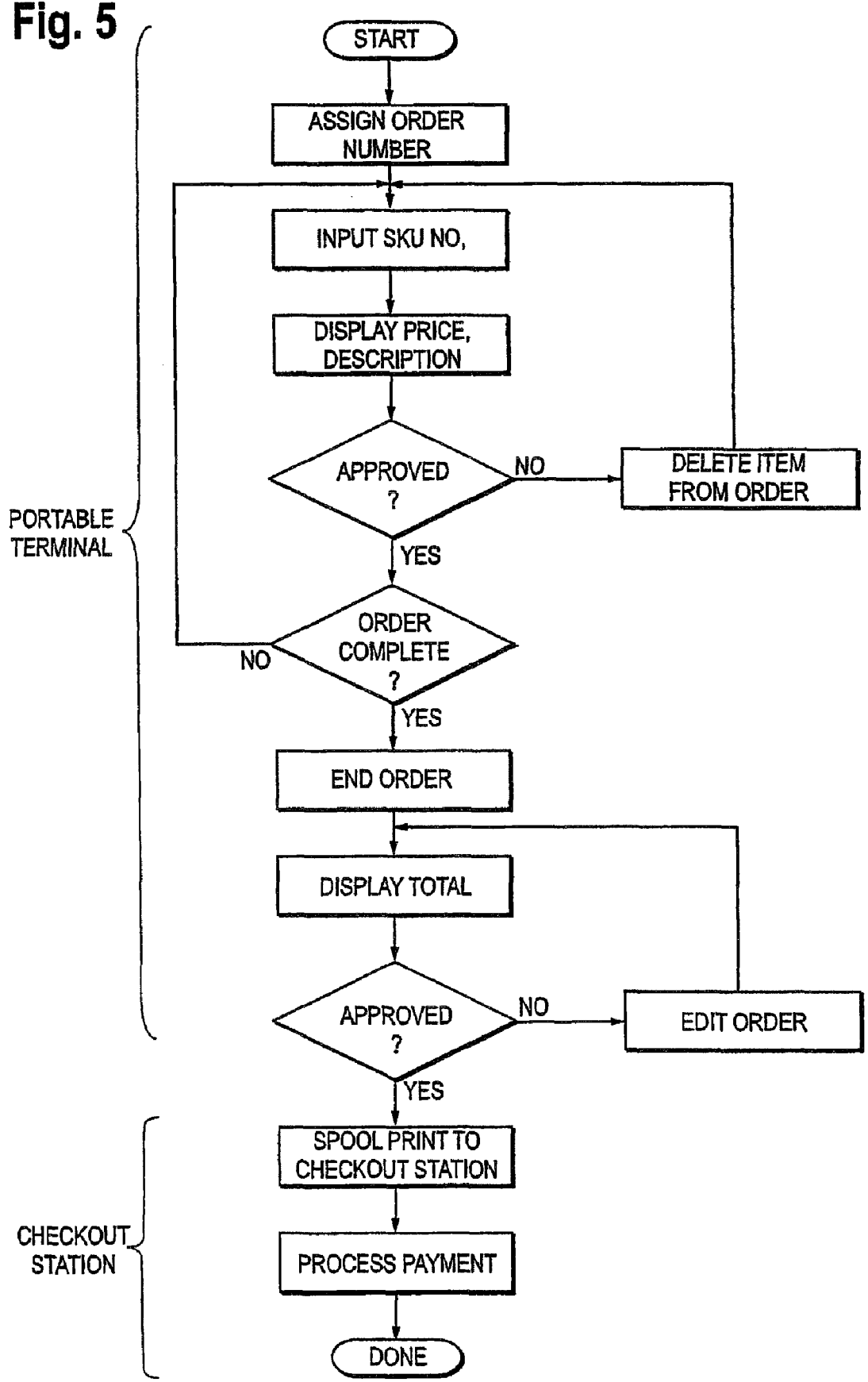
FIG. 5 is a flow diagram illustrating the exemplary functionality of one of a number of control sequence that may be followed by the system and the multi-function control unit of FIG. 4.

FIG. 5 is a flow diagram illustrating the exemplary functionality of one of a number of control sequence that may be followed by the system and the multi-function control unit of FIG. 4. In particular, the flow diagram illustrates a transaction sequence beginning when a customer approaches a service clerk with the intent of consummating merchandise purchases. The service clerk is in possession of one of the data terminals 33. Upon initial contact with the customer the service clerk assigns a temporary order number. This may be performed in any of a number of ways. For example each of a number of service clerks may have assigned to them a specific employee number, such that the entry of the number immediately identifies the particular employee who is providing the service. Of course, the particular data terminal is uniquely identified by the central computer. Consequently, another procedure by which a number assignment may be made is a direct assignment as the result of the data terminal signing on. Such initial sign-on triggers the computer to open a file, hence to assign a temporary order number, as indicated by the step ASSIGN ORDER NUMBER. Thus the order number is transmitted to or generated by the central computer 11 or HOST, as indicated in the flow diagram.

The service clerk now enters the first merchandise number, an SKU number, into the data terminal 33 and transmits the SKU number of the selected merchandise item to the central computer (INPUT SKU NO.). The computer looks up the price and merchandise description in its memory 13 and transmits the information to the data terminal 33 (DISPLAY PRICE, DESCRIPTION). At this point the customer may make a decision. For example, the price may not meet the customer's expectations because of a missed date for a special sales price or because a certain size or color of an item is no longer available. The customer is in a position to choose the item or to decline it. This is indicated by the decisional step APPROVED?. If the item is not chosen, the purchase is not approved, the item is deleted from the order, hence from the temporary file that has been opened for the customer in the memory 13 of the computer 11, as indicated by the step DELETE ITEM FROM ORDER. If the customer chooses the selected item, hence approves its purchase the service clerk may inquire with the customer whether another purchase is to be made (ORDER COMPLETE?). If another item is to be purchased, another selection is made and the SKU number is again entered and transmitted to the computer 11. The process is repeated through the ORDER COMPLETE? decisional step until the query can be answered in the affirmative. At that point the instruction END ORDER is transmitted to the host, the computer 11.

The computer 11 at this point interactively transmits the sum total of purchased items including taxes to the data terminal 33. The total is displayed on the digital readout 35 of the terminal 33, and the customer has again the choice to approve or disapprove the purchase. The customer may disapprove, for example, because the sum total exceeds credit limits or budgetary restraints. In case of non-approval the EDIT ORDER step allows for the deletion of an item and the display of the revised sum total. If the final purchase stands approved, the next step is to assign final processing to one of the customer service stations 40 as described herein above.

The final processing differs from processing a customer's purchases at a typical cash register. Referring, for example, to a typical check-out operation, the customer may have indicated to the service clerk the preferred manner in which payment is to be made, such as by credit card. A station number of a conveniently located mobile customer service station 40 is entered into the data terminal 33 and transmitted to the computer 11. The computer matches the temporary order number with the station number of the selected customer service station 40 and transmits the information to the customer service station 40. It is to be noted that the data terminal 33 is not directly linked to the customer service station 40, in that the radio transceiver 38 of the data terminal 33 is on an equal hierarchical level with the transceiver 47 of the customer service station 40. Both are by design unable to communicate with each other. However, the computer 11 provides the interactive communications interface for effectively linking the data terminal 33 to function as the input keyboard for the customer service station 40.

In one contemplated method of operation, the service clerk is in the position to enter the customer's name and transmit that information to the computer 11. This may be done, for example while another clerk processes another customer at the same customer service station 40 at which the current transaction will subsequently be completed. Thus, the service clerk does not require actual or direct access to the customer service station 40 to enter such preliminary customer information into the computer 11. The direct communication of customer data from the data terminal 33 to the computer 11 is of particular advantage if the customer has an approved line of credit with the store and the credit information can be checked against the current transaction without the need to step up to the customer service station 40. Thus, an often disliked and sometimes confusing congestion as is found at typical cash registers may be avoided.

As soon as the previous customer transaction by another service clerk is completed at the selected customer service station, the service clerk in the next current transaction will have service from the multi-station printer 46. The purchase receipt with or without a credit agreement is printed presented to the customer, for signature if a purchase has been made on credit. The merchandise is now either packed at a separate station or the customer service station 40 can be employed for such additional purpose. When either the financial record printing or both printing the receipt and wrapping the purchased items is completed, the work at the customer service station is done and the next customer can be processed.

It is readily seen that a per-customer processing time at the customer service station 40 is reduced with respect to that of typical point-of-sale registers, since the use of a single keyboard at the typical point-of-sale register is used for checking out merchandise items and verifying customer credit information. Thus even when point-of-sale check-out registers are coupled into a computer with the ability to total purchases ahead of the customer stepping to the register, the typical time consuming information taking and approval process at the register remains.

The mobility of the stations 40 offer a number of advantages, in that the stations 40 are readily moved about on a sales floor without the need for wiring changes or installation. A basic mode of operation is an augmentation of an existing point of sales system 23 which already uses the radio communications system 21 for inventory control functions. In the referred-to system having the capability of addressing a total of sixteen radio transceiver units 38, a substitution of four terminals 33 changes the radio communications system 21 to include a full complement of twelve data terminals 33 and four customer service stations 40, hence a ratio of three data terminals to each customer service station 40. While this number of substitution is given as a convenient example, other ratios are certainly possible. An optimum ratio of data terminals 33 to mobile customer service stations 40 is recognized as depending on the particular merchandizing environment. While the use of a number of data terminals 33 exceeding the number of customer service stations is seen as advantageous for many check-out operations, using the same number of customer service stations 40 as there are data terminals 33 is within the scope of the invention. In fact, one may also substitute and use a number of customer service stations 40 which exceeds the number of active data terminals 33. The flexibility in the system 10 as described herein is seen as an advantage and benefit of the current invention. The described flexibility of the transaction control system 10 is seen furthermore as being particularly useful during seasonal peak demands during which additional customer check-out terminals or facilities may be needed and wiring installations are not deemed feasible.

Another application for use of the customer service stations 40 is a temporary location from which complex wiring for connections to a central computer 11 is not feasible, such as a tent, garden or warehouse sale. In such an area there are typically no provisions for coupling a sales terminal to a central computer 11. A proper wiring installation for computer-controlled check-out facilities would frequently not be feasible. In addition to the cost of installing electrical wiring, time factors involved in making wiring installations severely hampers the intent of installing a customer service terminal quickly in response to a present demand. On the other hand, the mobile customer service station 40 is readily moved to the desired location. If the placement of the terminal 40 is in the general area and range of the permanent installation of the radio communications system 21, then no relay station or electrical wiring installation is required. As an alternative, for unusually remote locations, a single one of the hard-wire cables 20 may be needed to simply locate the communications controller 31 and the base transmitter station 32 into the general locale in which a plurality of the customer service stations are to be used.

Using a plurality of the data terminals 33 for keying in information to each mobile customer service station 40 potentially reduces the check-out time per customer at the station to about one third of that required at a full check-out station. The contemplated use of the data terminal 33 in combination with the mobile customer service station 40 consequently not only provides a check-out station that improves customer service but also enhances the usefulness of the data terminals 33 to their owners.

A further application for the customer service stations 40 is at a trade fair or exhibition, particularly at one at which a number of commonly controlled sales areas are located in different parts of a fair grounds. In such event the computer can maintain accurate central control over all sales areas.

Particularly in this latter example, the system is intended to function not as an augmentation to an existing stationary point-of-sale system, but as an independently functioning mobile customer service system.

Figure 6:
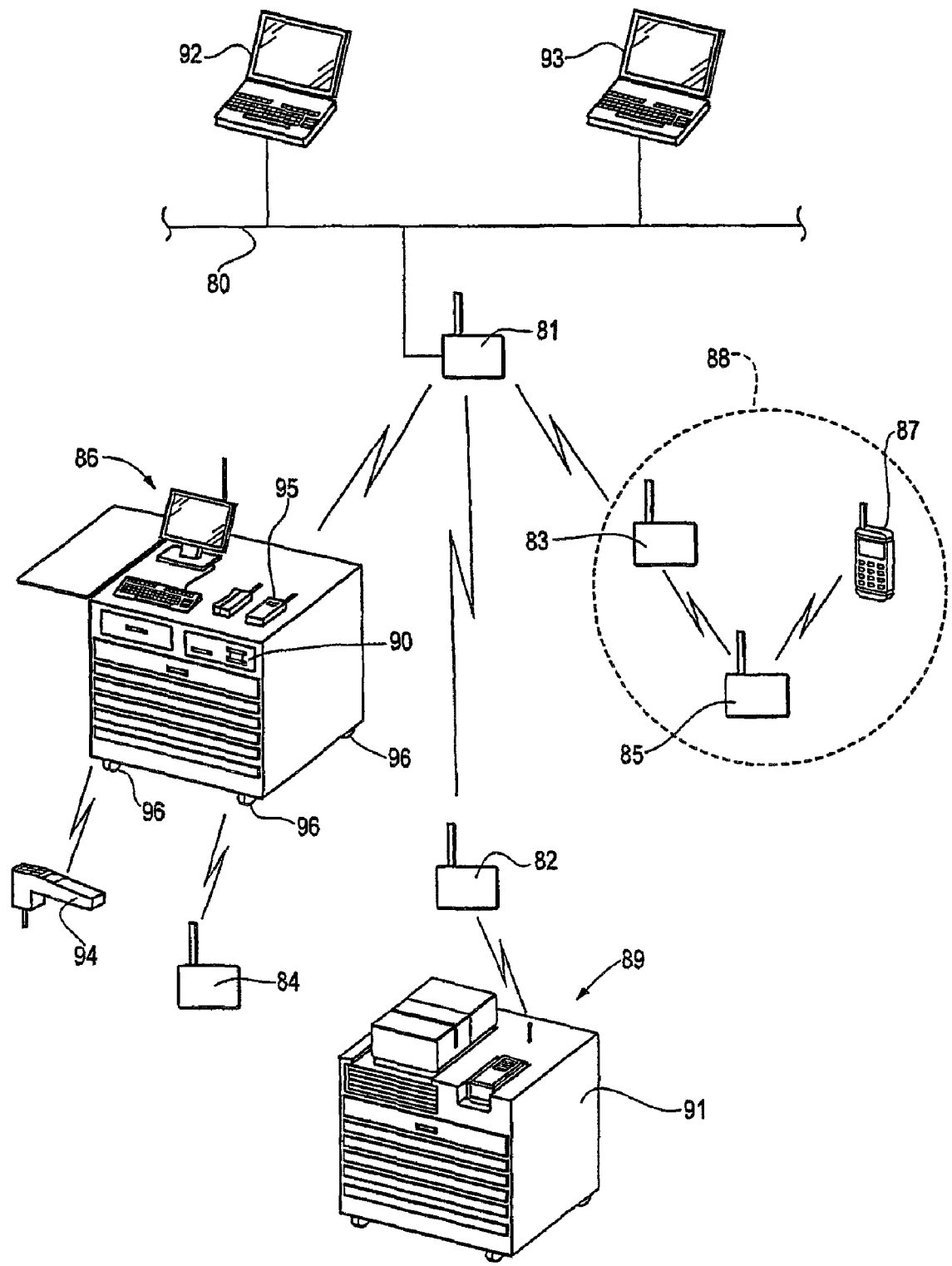
FIG. 6 is a diagram illustrating the communication pathways for establishing communication among the various devices in the communication network in accordance with the present invention.

FIG. 6 is a diagram illustrating the communication pathways for establishing communication among the various devices in the communication network in accordance with the present invention. In particular, the overall communication network of the present invention is arranged into two functional groups: 1) a main communication network or premises network; and 2) a plurality of subnetworks or peripheral LAN's, e.g., each mobile customer service station.

The premises network in the illustrated embodiment comprises a hard-wired backbone LAN 80, access devices 81, 82, 83, 84 and 85, and an access device 90 mounted within a mobile service station 86. As shown, mobile network devices such as a terminal 87 and a wireless transceiver 91 mounted on a mobile service station 89 participate in the premises network via the access device 82 and 85, respectively.

Access devices may be either "access points" or "access servers" depending on the specific network application. An access point is a relaying device in the premises network. It typically receives data or other information which it relays toward the destination. In addition, as is evident from its name, an access server functions as an entry point for communications originating from various network devices which do not form part of the premises network, but merely participate thereon. For example, the terminal 87 or mobile service station 89 (or its subcomponents) are not part of the premises network, although they do participate in the premises network. To gain access to the premises network, such network devices communicate through an access point (or access server).

An "access server" is an access point which has been configured to provide (for the various network devices) data or program code storage and retrieval and/or to perform processing. The access devices 81-85 need only be access points, however, preferably, the access device 90 is an access server which stores and retrieves data and performs specialized processing related to the servicing provided at the mobile service station 86.

Although other data forwarding configurations may be used, the illustrated premises network is arranged in a spanning tree configuration. Data is routed from one network device to another through the access devices 81-85 and 90 and the backbone LAN 80, when necessary. The access device 81 is designated a root device. Communications flowing toward the root are considered to flow downstream. Communications flowing away from the root are considered to flow upstream. Each access device contains a table having entries for each network device in one of that access device's upstream paths. The table also has an entry identifying the next access device in the downstream path. Further detail regarding wireless spanning tree data flew can be found in U.S. Pat. No. 5,428,636, issued on Jul. 27, 1995, by Robert C. Meier.

Computers 92 and 93 and any other non-mobile (stationary) network device located in the vicinity of the backbone LAN 80 can be directly attached to the backbone LAN 80. The backbone LAN 80 may be any type of hardwired communication media or protocol such as, for example, ethernet, RS232, token ring, etc. Mobile devices and remotely located stationary devices must maintain connectivity to the backbone LAN 19 through either a single access device such as the access device 81, or through a multi-hop network of access devices such as is illustrated by the access devices 81-84 and 90.

The access devices 81-84 and 90 contain a relatively higher power wireless transceiving capability to provide coverage over an entire premises such as a merchandising floor. Although a single access device may be sufficient to communicate with all wireless network devices, if the premises is too large or contains interfering physical barriers, a plurality of access devices may be necessary. Through the premises network, relatively stable, longer range wireless and hard-wired communication is maintained.

Network devices that are mobile or remote (i.e., cannot be directly connected to the backbone LAN 80) are fitted with wireless transceivers. Although RF transceivers are used, alternate wireless media, such as for example infrared transmissions, might be implemented where the conditions so suggest, e.g., infrared transceivers are most useful in line of sight, non-mobile situations.

To guarantee that a mobile or remote network device will be able to directly communicate with at least one of the access devices 81-85 or 90, the network device is fitted with a transceiver capable of yielding approximately the same transmission power as that of the access devices 15 and 17. However, not all mobile or remote network devices require a direct RF link to the access devices 81-85 or 90, and some may not require any link at all. Instead, for example, communication may be generally localized to a small area and, as such, only needs to use relatively lower power, shorter range transmissions. This is generally the situation with peripheral type network devices, such as printers, plotters, scanners, magnetic card readers, etc.

Therefore, instead of requiring all network transmissions at the relatively higher power level, devices needing only shorter range transmissions to intercommunicate form and participate in the localized, short range communications herein called a "peripheral LAN". For example, intercommunication between peripheral devices such as a printer 95 and code reader 94 provides a justification for a peripheral LAN configuration. Other network devices can also participate in any peripheral LAN formed, and any network devices participating in the peripheral LAN can communicate with any other participating device.

Thus, when the code reader 94 is within a short range distance from the printer 95, the code reader 94 can communicate, using a lower power transmission saving battery power, information to be printed. When out of short range of the printer 95, the code reader 94 must either use another short range (peripheral LAN) pathway, use higher power premises network transmissions, or wait until again within short range of the printer 95. For example, the terminal 87 can communicate with the printer 95 via the premises network. In particular, the terminal 87 sends data destined for the printer 95 to the access device 85 using a higher power transmission. The access device 85 examines its routing table attempting to identify the printer 95 in an upstream path. Upon failing to find an entry for the printer 95, the access device 85 sends the data downstream to the access device 83. The access device 83 similarly fails to identify the printer 95 and forwards the data downstream to the root, the access device 81. The access device 81 identifies the printer 95 in an upstream path and routes the data upstream to the access device 90. Finally, the access device 90 participates in a peripheral LAN with the printer 95 at a lower power level to complete the delivery of the data to the printer 95. However, should the terminal 87 move into the shorter range of the printer 95, the terminal 87 will either join in an ongoing peripheral LAN in which the printer 95 participates, or will together with the printer 95 form a new peripheral LAN. Upon moving out of the short range, the terminal 87 can reestablish a communication pathway through the premises network to the printer 95.

Although the printer 95 may be configured to communicate on both a peripheral LAN or the premises network, the printer 95 need only be configured to communicate on a peripheral LAN. Thus, the printer 95 can only indirectly communicate on the premises network, i.e., only through another network device which participates on both the premises network and peripheral LAN.

Configuration for communication involves the installation of either a single radio capable of adapting to participate on both the premises network and peripheral network, or two radios—one for each network. Further detail regarding such configurations can be found in pending application U.S. Ser. No. 08/487,609, filed Jun. 7, 1995, by Mahany et al., which is incorporated herein by reference in its entirety.

In an alternate configuration (not shown), the access device 90 may be directly connected to the backbone LAN 80, instead of indirectly via the access device 81. In such an alternate configuration, the access device 90 avoids high power radio transmissions altogether, except when communicating upstream (if so configured). Otherwise, only peripheral LAN transmissions need be made. However, it can be appreciated that by making a hardwired direct connection to the backbone LAN 80, the mobile service station 86 becomes stationary. Alternately or in addition, wheels 96 could be removed and hardwired power added, fully converting the station 86 into a rather permanent, stationary service station.

As briefly described above, in any peripheral LAN, the participating devices ("peripheral LAN devices") need not all possess the transceiver capability to reach the premises network. However, at least one peripheral LAN device needs to have that capability if overall network connectivity is to be maintained. Moreover, if the mobile service station 86 is moved out of range of the premises network, i.e., out of higher power wireless range of the other access devices 81-85, the peripheral LAN associated with mobile service station 86 detaches from the premises network for independent operation. Upon moving back within the higher power range, the associated peripheral LAN reattaches to the premises network. Similarly, if a peripheral LAN is formed without having a participating network device which can also participate with the premises network, it is considered "detached" from the premises network. Upon the event that a device which does participate on the premises network joins a detached peripheral LAN, that peripheral LAN automatically "attaches" to the premises network.

The components (network device) within the mobile service station 89 operate with a single wireless link with the premises network as described previously, for example, in reference to FIG. 2 or 3 above. In particular, within the mobile service station 89, each network device is hardwired to a controller unit which communicates via a radio transceiver through the premises network. No wireless peripheral LAN is ever formed. However, the alternate embodiment of the mobile service station, the mobile service station 86, as previously mentioned, is configured to participate in both the premises network and peripheral LAN's. Further detail regarding the embodiment of station 86 can be found below in reference to FIG. 7.

Although the mobile service station 86 is shown to be configured with an access device 90, it need not be. Instead, any of the network devices disposed on or in the mobile service station could be configured to participate in the premises network and peripheral LAN's, alleviating the need for the access device 90. However, the access device 84 would find an alternate premises network pathway towards the root, for example, such as through the access device 82.

Figure 7:
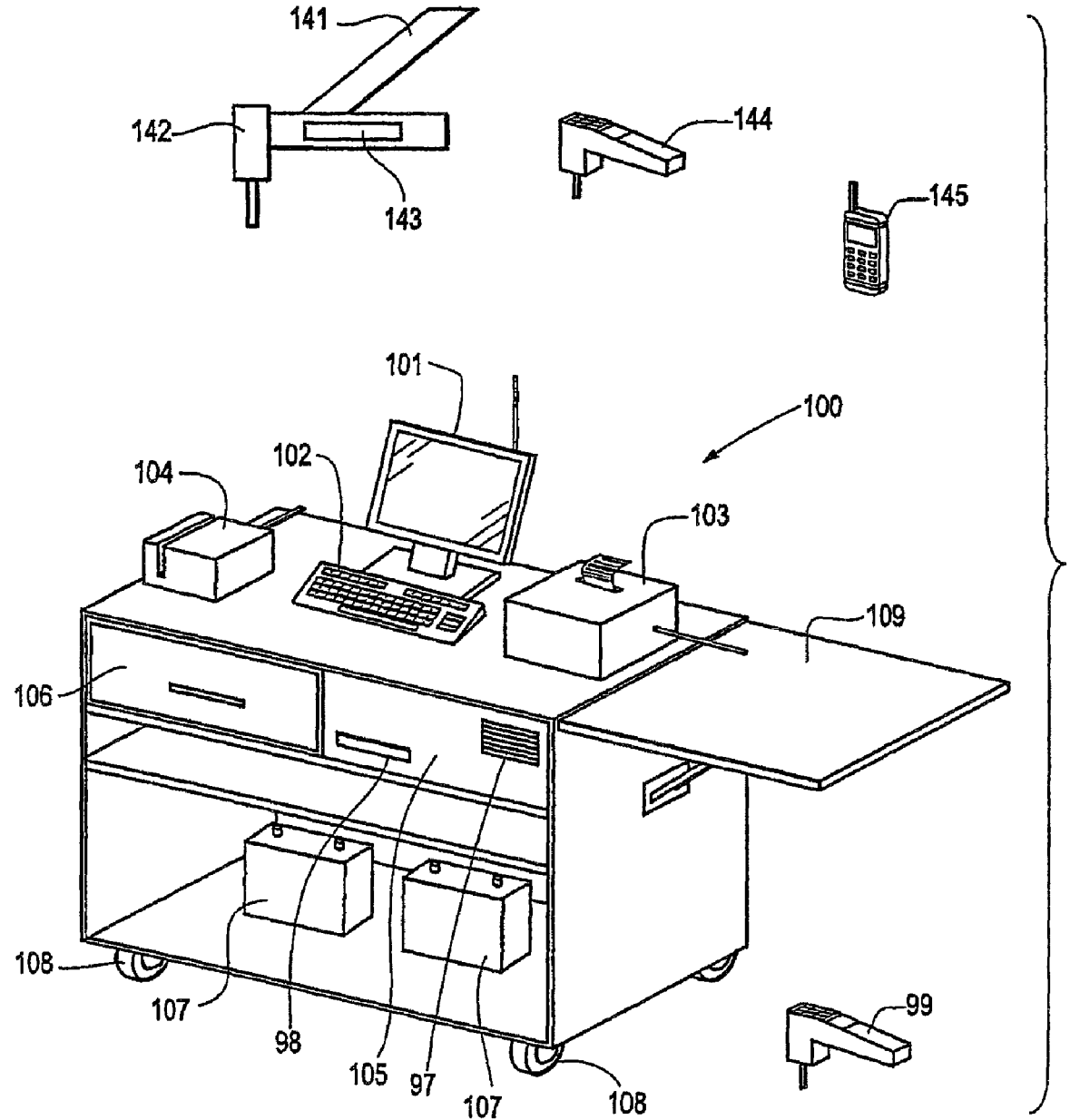
FIG. 7 is a perspective diagram showing another embodiment of the mobile customer service station of FIG. 1 which is adapted to wirelessly communicate through both a premises network and a peripheral LAN.

FIG. 7 is a perspective diagram showing another embodiment of the mobile customer service station of FIG. 1 which has been configured with a variety of wireless network devices that together communicate through a premises network and a peripheral LAN. Specifically, disposed within and on a mobile service station 100, a screen 101, keyboard 102, printer 103, magnetic card reader 104, access server 105 and cash drawer 106 can be found. Although each of these components or devices could be considered wireless network devices if attached as a functional unit to a wireless transceiver, as illustrated, only the card reader 104, printer 103 and screen 101 are so configured. Thus, along with a code reader 99, these devices participate with the access device 105 on a peripheral wireless LAN.

Battery power is provided by a pair of 12 volt batteries 107 hidden behind a panel (not shown) of the mobile service station 100. A fold-out table extension 109 is also provided to extend the work area once a temporary destination has been reached. Wheels 108 may be locked in place for stability, or may be completely removed to accommodate more permanent (stationary) installations. The access device 105 is also fitted with a disk drive 98 for moving information to or from the access device 105 if the communication link to the premises network fails. Although a disk drive 98 is shown, alternate forms of removable storage might be used such as a tape drive, flash memory cards, optical drives, etc.

The access device 105 has a plurality of PCMCIA type slots, slots 105, for receiving, for example, a radio for communicating on the premises network, a radio for communicating on the peripheral network (or a single radio capable of communicating on both), a cellular phone, a paging unit, wired modem, ethernet card, etc. Although illustrated on the front of the mobile service station 100, the slots might alternately be located on the back, side or within the station 100.

Peripheral LAN communication occurs over a relatively shorter range than that of the premises network. Thus power consumption can be significantly reduced with local communication within the peripheral LAN which needs relatively minimal transmission power. For example, images may be recorded by the code reader 99, transmitted via the peripheral LAN to the access device 105. In response, the access device 105 functioning as a access server classifies and/or decodes the image. Thereafter, the access device 105 attempts to identify associated data (e.g., text) associated with the classified/decoded image. If found in local storage within the access device 105, the data is transmitted back via the peripheral LAN to the code reader 99. If not found locally, the access device 105 communicates through the premises network to find the data. In addition, once located, the data may also be printed on the printer 103, such as in a receipt format, in response to peripheral LAN communication from the access device 105 or the code reader 99, for example. The data might also be printed in response to a command from another device in the premises network (not shown).

In addition; as previously mentioned, the mobile station 100 need not be configured with an access device. However, of the remaining devices (components) within the mobile service station 100, at least one must be able to communicate with the premises network else the mobile station 100 will operate in isolation, "detached" from the premises network.

FIG. 7 also illustrates another embodiment using a peripheral LAN to supporting roaming data collection and remote transaction processing by an operator according to the present invention. An operator wearing a belt 141 carries a peripheral LAN comprising a terminal 145, code reader 144 and a printer 142 (supported by the belt 141). Other peripheral devices might also be carried or worn on the belt 141 such as, for example, the magnetic card reader 104.

The operator collect information regarding merchandise to be purchased, for example, with either the code reader 144 or the terminal 145. If the power resources were equal, the terminal 145 would be designated to also communicate with the premises network. However, the belt 141 is also fitted with a battery pack 143 which, upon docking the printer 142 to the belt 141, provides battery power to the printer 142. Therefore, any belt docked device becomes a prime candidate for operation on the both the peripheral LAN and premises network (unless it does not have the radio capability for participation on the premises LAN). Thus, in addition to performing the printing function, the printer 142 acts as an intermediary between the other network devices in the peripheral LAN, i.e., the code reader 144 and the terminal 145, and the premises LAN.

In a specific application of the network devices illustrated in FIG. 7, an operator wearing the belt 141 carries a code reader 144 and the printer 142 through a long line of customers awaiting check-out at the service station 100. One customer at a time, the operator uses the code reader 144 to read code information printed on or associated with merchandise being purchased. Once all of a customer's merchandise has been recorded, the printer 142 is directed to print a receipt having an identifying code thereon. This direction may come directly from the code reader 144 via the peripheral LAN or from another network device via the premises network. In addition, the collected code information is forwarded to, for example, a computer (not shown), for example the computer 92 (FIG. 6), via the premises LAN.

After printing a receipt on the printer 142, the receipt is handed to the customer. When the customer reaches the mobile service station 100, instead of re-reading the code information from each of the merchandise items being purchased, the printed receipt is delivered to the operator of the station 100 who uses the code reader 99 to read the code printed thereon. The code reader 99 communicates that code via the peripheral LAN back to the access device 105 which, in turn, communicates the code through the premises network to the computer (not shown) that stored and possibly supplemented the previously collected merchandise code information. The computer responds by forwarding such information to the access device 100 via the premises network. In turn, via the peripheral LAN, the access device 105 delivers the information to the screen 101 for display and to the printer 103 for final printing. If cash is tendered, the access device 105 responds to operator input via the keyboard 102 by calculating change due, for example, and automatically opening the cash drawer 106. Alternately, if a credit card is swiped through the magnetic card reader 104, the reader 104 responds by sending the card information via the peripheral wireless LAN to the access device 105. In response, the access device 105 sends a verification/authorization request through the premises network for further forwarding to a possibly remote credit card processing center. Responsive verification and authorization information flows back to the access point 105 via the premises network for completing the transaction.

In another embodiment, a card reader such as the card reader 104 may also be docked on the belt 141 to further off-load the mobile transaction station. Thus, to promote interchangeability of network devices, the belt 141 and mobile service station 100 both use the same network devices and both have similar docking arrangements.

Moreover, if during collection of information the operator wearing the belt 141 decides to power down the printer 142, the peripheral LAN becomes detached from the premises network. Although it might be possible for the detached peripheral LAN to function, except for printing, all premises network communications are placed in a queue awaiting reattachment. As soon as the detached peripheral LAN comes within range of an attached peripheral LAN device, i.e., any network device attached to the premises network, the queued communications are relayed to the premises network. This would occur whenever the printer 142 is turned back on, or when the operator walks within lower power range of the access device 105.

To avoid detachment when the printer 142 is powered down (or runs out of battery power), the terminal 145 may be designated as a backup for performing the higher power communication to the premises network. As described in more detail below in reference to FIG. 11c regarding the idle sense protocol, whenever the terminal 145 determines that the printer 142 has stopped providing access to the premises network, the terminal 145 takes over the role if it is next in line to perform the backup service. Thereafter, when the printer 142 powers up, it monitors the peripheral LAN, requests and regains from the terminal 145 the role of providing an interface with the premises network. This, however, does not restrict the terminal 145 from accessing the premises network although the terminal 145 may choose to use the printer 142 for power conservation reasons.

In addition, if the printer 142 reaches a predetermined low battery threshold level, the printer 142 will attempt to pass the burden of providing premises network access to other peripheral LAN backup devices. If no backup device exists in the current peripheral LAN, the printer 142 may force the peripheral LAN into a detached state from the premises network by refusing all high power transmissions to the premises network. Alternatively, the printer 142 may either refuse predetermined select types of requests, or prompt the operator before performing any transmission to the premises network. However, the printer 142 may still listen to the communications from the premises network and inform peripheral LAN members of waiting messages.

The above example involving the mobile service station 100 applies equally to the situation where the mobile service station 100 is made stationary, i.e., by removing the wheels 108 and hard-wiring it to power and/or the premises network. In fact, the above example applies to service stations which are permanently stationary, so long as the related component/device subparts have the described network functionality.

Figure 8:
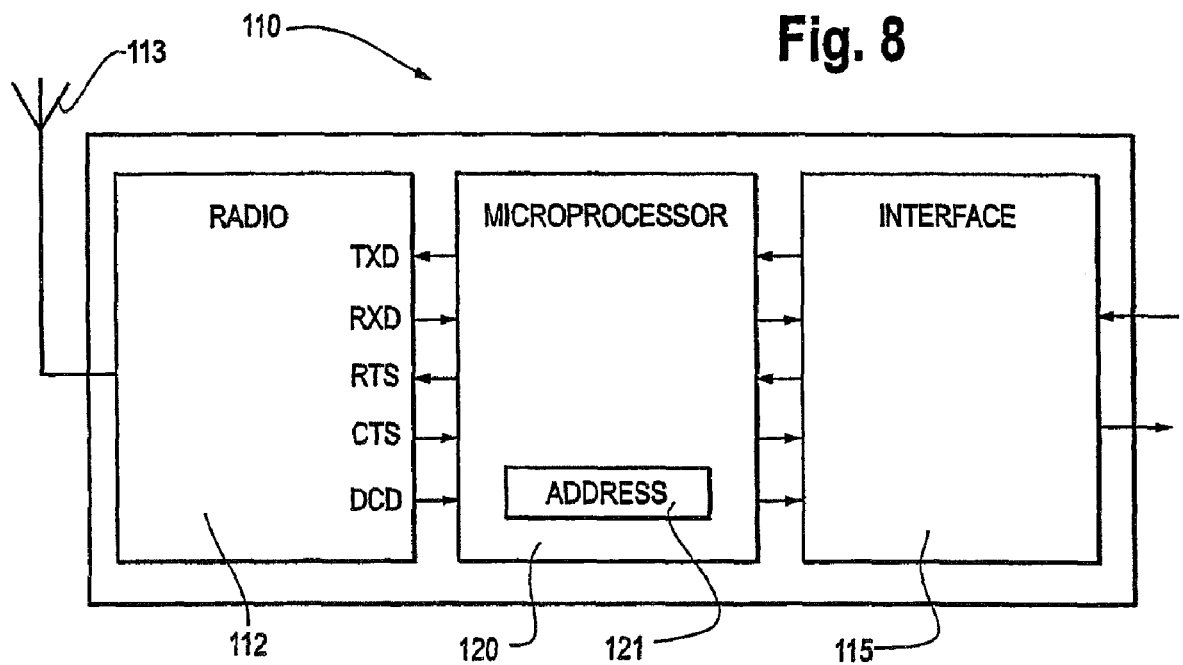
FIG. 8 is a block diagram illustrating the functionality of wireless transceivers built in accordance with the present invention.

FIG. 8 is a block diagram illustrating the functionality of a wireless transceivers built in accordance with the present invention. Although preferably plugging into PCMCIA slots of the computer terminals and peripherals, the transceiver 110 may also be built-in or externally attached via available serial, parallel or ethernet connectors for example. Although the transceivers used by potential peripheral LAN master devices may vary from those used by peripheral LAN slave devices (as detailed below), they all contain the illustrated functional blocks.

A peripheral LAN will usually consist of one or more network devices (typically peripherals) slaved to a single master roaming network device, i.e., a roaming "computing device". For example, referring to FIG. 7, the participating network devices in associated with the belt 141 include the printer 142, terminal 145 and code reader 144. Any one of these devices might also participate on the premises network, if so configured. Any one, not necessarily the one with mutual participation, might be assigned the role of a master device in the peripheral LAN. The rest of the network devices in the peripheral LAN are then considered slaves, although multiple master roaming computing devices are contemplated.

In particular, the transceiver 110 contains a radio unit 112 which attaches to an attached antenna 113. The radio unit 112 used in peripheral LAN devices that are assigned the task or backup task of participating on the premises LAN need only provide reliable low power transmissions, and are designed to conserve cost, weight and size. Otherwise, the radio unit 112 must be designed for higher power and possibly more complex protocol transmissions with the premises network. Thus, some network devices may contain two radio units 112 or two transceivers 110—one serving the premises network and the other serving the peripheral LAN. Alternately, they may contain a single radio unit designed to service both networks.

In embodiments where cost and additional weight is not an issue, a dual radio unit configuration provides several advantages. For example, simultaneous transceiver operation is possible by choosing a different operating band for each radio. In such embodiments, for example, a 2.4 GHz frequency hopping radio may be included for premises network communication while a 27 MHz radio single frequency radio supports the peripheral LAN. As such, peripheral LAN devices receive the 27 MHz radio, while any network device which communicates only on the premises network are fitted with only the 2.4 GHz radios. Network devices which participate or may participate on both receive both radios (or both radio channel functionality).

A low power 27 MHz peripheral LAN radio is capable of reliably transferring information at a range of approximately 40 to 100 feet asynchronously at 19.2K BPS. An additional benefit of using the 27 MHz frequency is that it is an unlicensed frequency band. The 2.4 GHz radio provides sufficient power (up to 1 Watt) to communicate with other premises network devices. Many different frequency and protocol choices could also be made such as the 900 MHz band, frequency hopping, etc.

Alternately, in some embodiments, a dual mode 2.4 GHz radio supports both the peripheral LAN and premises network. In a peripheral LAN mode, the 2.4 GHz radio operates at a low power level (sub-milliwatt) to support peripheral LAN communication at relatively close distances (20-30 feet). In a high power (up to 1 Watt) or main mode, the 2.4 GHz radio provides relatively long distance communication connectivity with the premises network.

Connected between the radio unit 112 and an interface 110, a microprocessor 120 controls the information flow between through the transceiver 110. Specifically, the interface 115 connects the transceiver 110 to a selected computer terminal, a peripheral device or other network device. Many different interfaces 115 are used and the choice will depend upon the connection port of the device to which the transceiver 110 will be attached. Virtually any type of interface 110 could be adapted for use with the transceiver 110 of the present invention. Common industry interface standards include RS-232, RS-422, RS-485, 10BASE2 Ethernet, 10BASE5 Ethernet, 10BASE-T Ethernet, fiber optics, IBM 4/16 Token Ring, V.11, V.24, V.35, Apple Localtalk and telephone interfaces. In addition, via the interface 115, the microprocessor 120 maintains a radio independent, interface protocol with the attached network device, isolating the attached device from the variations in radios being used.

The microprocessor 120 also controls the radio unit 112 to accommodate communication with the either the premises network (for main mode radios), the peripheral LAN (for peripheral LAN radios), or both (for dual mode radios). More specifically, in a main mode transceiver, the microprocessor 120 utilizes a main protocol to communicate with the premises network. Similarly, in a peripheral LAN mode transceiver, the microprocessor 120 operates pursuant to a peripheral LAN protocol to communicate in the peripheral LAN. In the dual mode transceiver, the microprocessor 120 manages the use of and potential conflicts between both the main and peripheral LAN protocols. Detail regarding the main and peripheral LAN protocols can be found in reference to FIGS. 11-14 below.

In addition, as directed by the corresponding communication protocol, the microprocessor 120 controls the power consumption of the radio 112, itself and the interface 115 for power conservation. This is accomplished in two ways. First, the peripheral LAN and main protocols are designed to provide for a low power mode or sleep mode during periods when no communication involving the subject transmitter is desired as described below in relation to FIGS. 11-12. Second, both protocols are designed to adapt in both data rate and transmission power based on power supply (i.e., battery) parameters and range information as described in reference to FIGS. 13-14.

In order to insure that the proper device is receiving the information transmitted, each device is assigned a unique address. Specifically, the transceiver 110 can either have a unique address of its own or can use the unique address of the device to which it is attached. The unique address of, the transceiver can either be one selected by the operator or system designer or one which is permanently assigned at the factory such as an IEEE address. The address 121 of the particular transceiver 110 is stored with the microprocessor 120.

Figure 9:
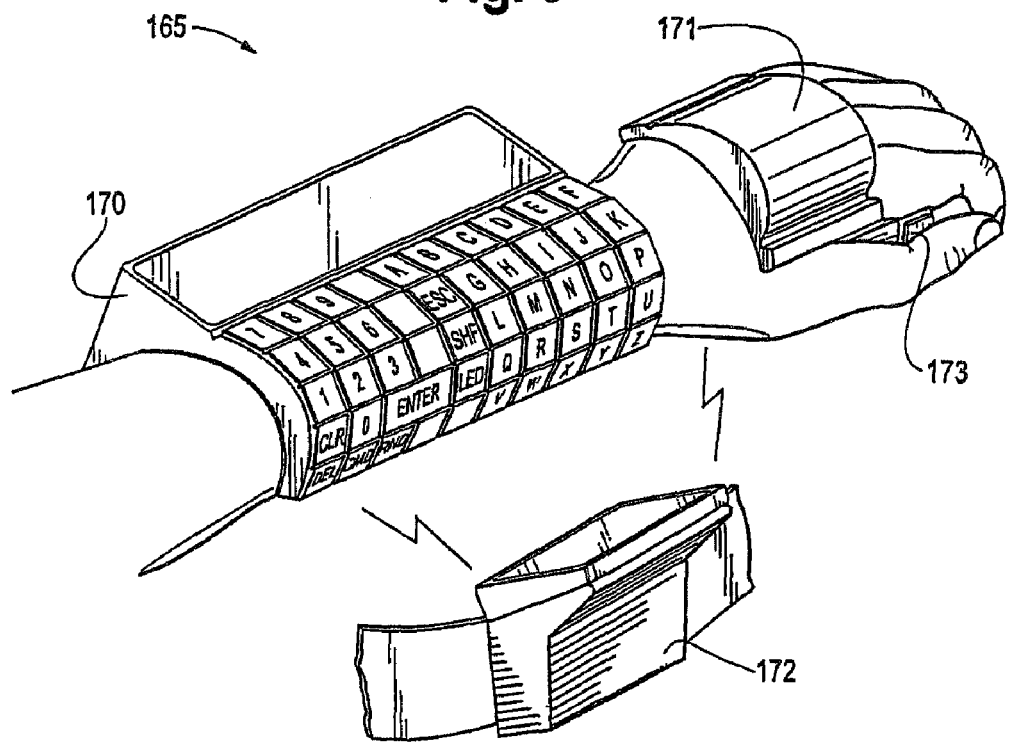
FIG. 9 is a diagrammatic illustration of an alternate embodiment of the peripheral LAN shown in FIG. 7.

FIG. 9 is a drawing which illustrates another embodiment of a peripheral LAN which designates a printer as the peripheral LAN master device and as a participant on both the peripheral LAN and premises network. Specifically, in a personal peripheral LAN 165, a computer terminal 170 is strapped to the forearm of the operator. A code reader 171 straps to the back of the hand of the user and is triggered by pressing a button 173 with the thumb. Because of their relatively low battery energy, the computer terminal 170 and code reader 171 are designated peripheral LAN slave devices and each contain a peripheral LAN transceiver having a broadcast range of two meters or less. Because of its greater battery energy, the printer 172 contains a dual mode radio and is designated the peripheral LAN master device.

Figure 10:
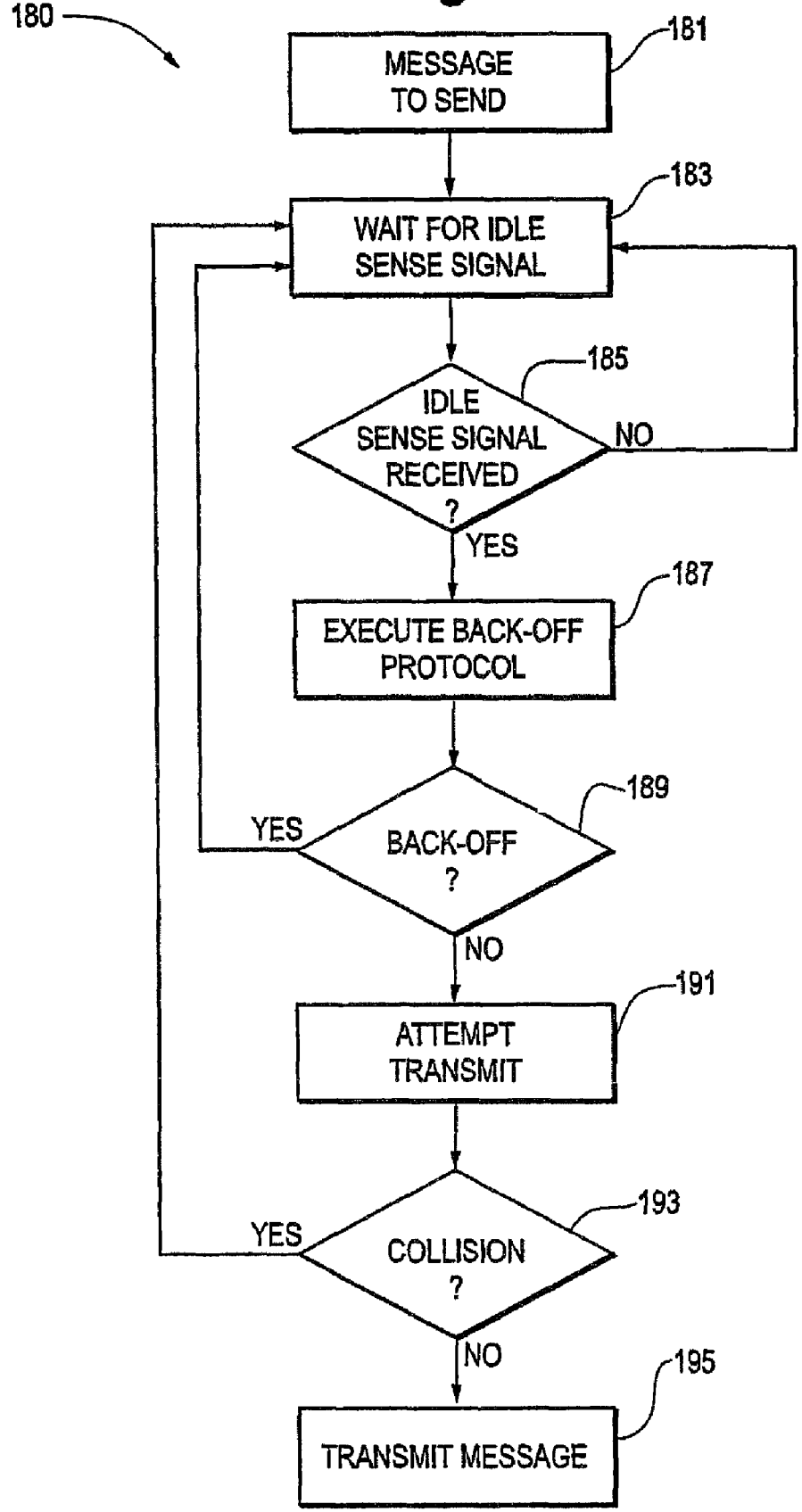
FIG. 10 is a block diagram illustrating a channel access algorithm used by slave devices in the peripheral LAN in accordance with the present invention.

FIG. 10 is a block diagram illustrating a channel access algorithm used by peripheral LAN slave devices in according to the present invention. At a block 181, when a slave device has a message to send, it waits for an idle sense message to be received from the peripheral LAN master device at a block 183. When an idle sense message is received, the slave device executes a back-off protocol at a block 187 by in an attempt to avoid collisions with other slave devices waiting to transmit. Basically, instead of permitting every slave device from repeatedly transmitting immediately after an idle sense message is received, each waiting slave is required to first wait for a pseudo-random time period before attempting a transmission. The pseudo-random back-off time period is generated and the waiting takes place at a block 187. At a block 189, the channel is sensed to determine whether it is clear for transmission. If not, a branch is made back to the block 183 to attempt a transmission upon receipt of the next idle sense message. If the channel is still clear, at a block 191, a relatively small "request to send" type packet is transmitted indicating the desire to send a message. If no responsive "clear to send" type message is received from the master device, the slave device assumes that a collision occurred at a block 193 and branches back to the block 183 to try again. If the "clear to send" message is received, the slave device transmits the message at a block 195.

Several alternate channel access strategies have been developed for carrier sense multiple access (CSMA) systems and include 1-persistent, non-persistent and p-persistent. Such strategies or variations thereof could easily be adapted to work with the present invention.

Figure 11A:
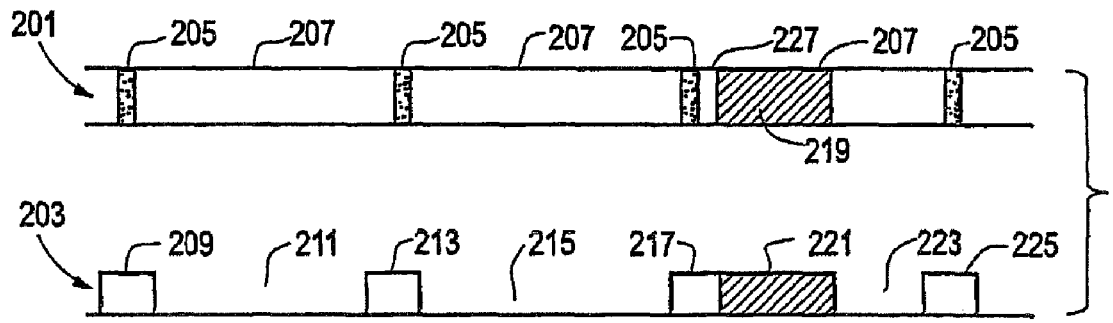
FIG. 11a is a timing diagram of the protocol used according to the present invention illustrating a typical communication exchange between a peripheral LAN master device having virtually unlimited power resources and a peripheral LAN slave device.

FIG. 11*a* is a timing diagram of the protocol used according to the present invention illustrating a typical communication exchange between a peripheral LAN master device having virtually unlimited power resources and a peripheral LAN slave device. Time line 201 represents communication activity by the peripheral LAN master device while time line 203 represents the corresponding activity by the peripheral LAN slave device. The master periodically transmits an idle sense message 205 indicating that it is available for communication or that it has data for transmission to a slave device. Because the master has virtually unlimited power resources, it "stays awake" for the entire time period 207 between the idle sense messages 205. In other words, the master does not enter a power conserving mode during the time periods 207.

The slave device uses a binding protocol (discussed below with regard to FIG. 11*c*) to synchronize to the master device so that the slave may enter a power conserving mode and still monitor the idle sense messages of the master to determine if the master requires servicing. For example, referring to FIG. 11*a*, the slave device monitors an idle sense message of the master during a time period 209, determines that no servicing is required, and enters a power conserving mode during the time period 211. The slave then activates during a time period 213 to monitor the next idle sense message of the master. Again, the slave determines that no servicing is required and enters a power conserving mode during a time period 215. When the slave activates again during a time period 217 to monitor the next idle sense message, it determines from a "request to send" type message from the master that the master has data for transmission to the slave. The slave responds by sending a "clear to send" type message during the time period 217 and stays activated in order to receive transmission of the data. The master is thus able to transmit the data to the slave during a time period 219. Once the data is received by the slave at the end of the time period 221, the slave again enters a power conserving mode during a time period 223 and activates again during the time period 225 to monitor the next idle sense message.

Alternatively, the slave may have data for transfer to the master. If so, the slave indicates as such to the master by transmitting a message during the time period 217 and then executes a back-off algorithm to determine how long it must wait before transmitting the data. The slave determines from the back-off algorithm that it must wait the time period 227 before transmitting the data during the time period 221. The slave devices use the back-off algorithm in an attempt to avoid the collision of data with that from other slave devices which are also trying to communicate with the master. The back-off algorithm is discussed more fully above in reference to FIG. 10.

The idle sense messages of the master may also aid in scheduling communication between two slave devices. For example, if a first slave device has data for transfer to a second slave device, the first slave sends a message to the master during the time period 209 requesting communication with the second slave. The master then broadcasts the request during the next idle sense message. Because the second slave is monitoring the idle sense message, the second slave receives the request and stays activated at the end of the idle sense message in order to receive the communication. Likewise, because the first slave is also monitoring the idle sense message, it too receives the request and stays activated during the time period 215 to send the communication.

Figure 11B:
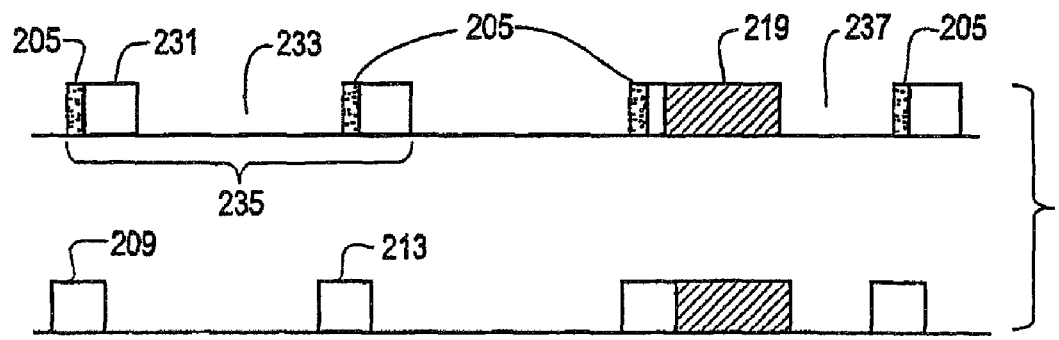
FIG. 11b is a timing diagram of the protocol used according to the present invention illustrating a typical communication exchange between a peripheral LAN master device having limited power resources and a peripheral LAN slave device.

FIG. 11*b* is a timing diagram of the protocol used according to the present invention illustrating a typical communication exchange between a peripheral LAN master having limited power resources and a peripheral LAN slave device. This exchange is similar to that illustrated in FIG. 11a except that, because it has limited power resources, the master enters a power conserving mode. Before transmitting an idle sense message, the master listens to determine if the channel is idle. If the channel is idle, the master transmits an idle sense message 205 and then waits a time period 231 to determine if any devices desire communication. If no communication is desired, the master enters a power conserving mode during a time period 233 before activating again to listen to the channel. If the channel is not idle, the master does not send the idle sense message and enters a power saving mode for a time period 235 before activating again to listen to the channel.

Communication between the master and slave devices is the same as that discussed above in reference to FIG. 11a except that, after sending or receiving data during the time period 219, the master device enters a power conserving mode during the time period 237.

Figure 11C:
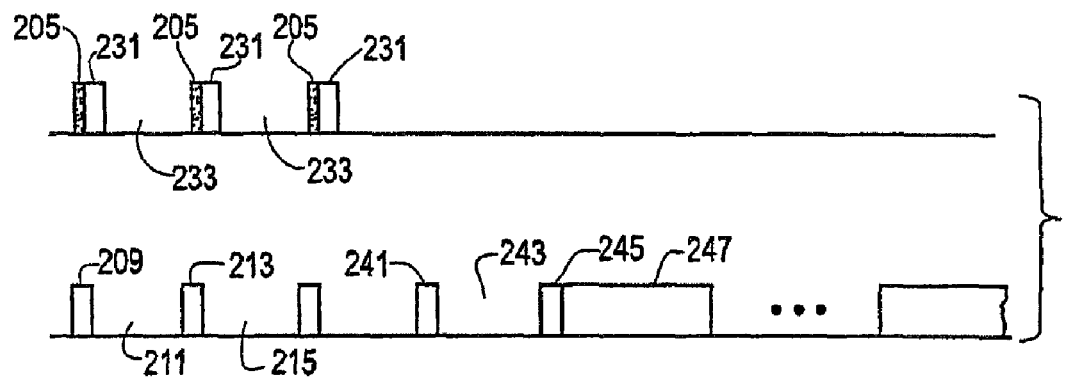
FIG. 11c is also a timing diagram of the protocol used which illustrates a scenario wherein the peripheral LAN master device fails to service peripheral LAN slave devices.

FIG. 11c is also a timing diagram of the protocol used which illustrates a scenario wherein the peripheral LAN master device fails to service peripheral LAN slave devices. The master device periodically sends an idle sense message 205, waits a time period 231, and enters a power conserving mode during a time period 233 as discussed above in reference to FIG. 11b. Similarly, the slave device monitors the idle sense messages during time periods 209 and 213 and enters a power conserving mode during time periods 211 and 215. For some reason, however, the master stops transmitting idle sense messages. Such a situation may occur, for example, if the master device is portable and is carried outside the range of the slave's radio. During a time period 241, the slave unsuccessfully attempts to monitor an idle sense message. The slave then goes to sleep for a time period 243 and activates to attempt to monitor a next idle sense message during a time period 245, but is again unsuccessful.

The slave device thereafter initiates a binding protocol to attempt to regain synchronization with the master. While two time periods (241 and 245) are shown, the slave may initiate such a protocol after any number of unsuccessful attempts to locate an idle sense message. With this protocol, the slave stays active for a time period 247, which is equal to the time period from one idle sense message to the next, in an attempt to locate a next idle sense message. If the slave is again unsuccessful, it may stay active until it locates an idle sense message from the master, or, if power consumption is a concern, the slave may enter a power conserving mode at the end of the time period 247 and activate at a later time to monitor for an idle sense message.

In the event the master device remains outside the range of the slave devices in the peripheral LAN for a period long enough such that communication is hindered, one of the slave devices may take over the functionality of the master device. Such a situation is useful when the slave devices need to communicate with each other in the absence of the master. Preferably, such a backup device has the ability to communicate with devices on the main communication network, e.g., on the premises network. If the original master returns, it listens to the channel to determine idle sense messages from the backup, indicates to the backup that it has returned and then begins idle sense transmissions when it reestablishes dominance over the peripheral LAN.

Figure 12:
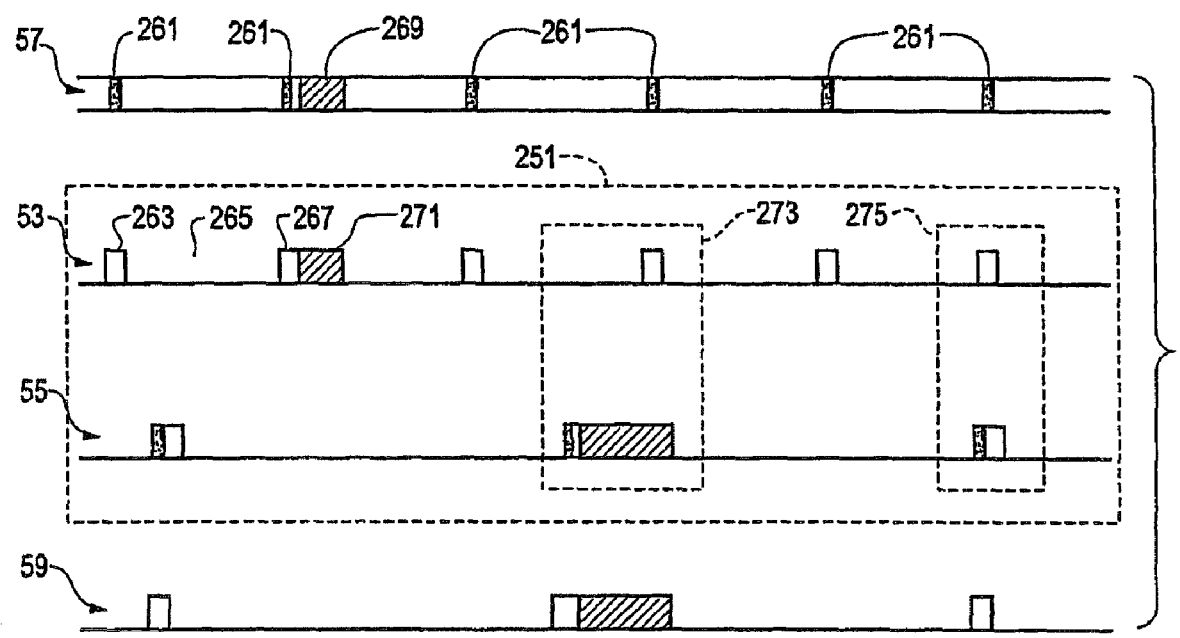
FIG. 12 is a timing diagram illustrating the peripheral LAN master device's servicing of both the high powered premises network, i.e., the premises network, and the low powered peripheral LAN subnetwork with single or plural radio transceivers.

FIG. 12 is a timing diagram illustrating the peripheral LAN master device's servicing of both the high powered premises network and the low powered peripheral LAN subnetwork, with a single or plural radio transceivers, in accordance with present invention. Block 251 represents typical communication activity of the master device. Line 253 illustrates the master's communication with a access device on the premises network while line 255 illustrates the master's communication with a slave device on the peripheral LAN. Lines 257 and 259 illustrate corresponding communication by the access device and slave device, respectively.

The access device periodically broadcasts HELLO messages 261 indicating that it is available for communication. The master device monitors the HELLO messages during a time period 263, and, upon determining that the base does not need servicing, enters a power conserving mode during a time period 265. The master then activates for a time period to monitor the next HELLO message from the base. If the master has data to send to the base, it transmits the data during a time period 271. Likewise, if the base has data to send to the master, the base transmits the data during a time period 269. Once the data is received or sent by the master, it may again enter a power conserving mode. While HELLO message protocol is discussed, a number of communication protocols may be used for communication between the base and the master device. As may be appreciated, the peripheral LAN master device acts as a slave to access devices in the premises network.

Generally, the communication exchange between the master and the slave is similar to that described above in reference to FIG. 11b. Block 273, however, illustrates a situation where the master encounters a communication conflict, i.e., it has data to send to or receive from the slave on the subnetwork at the same time it will monitor the premises network for HELLO messages from the base. If the master has two radio transceivers, the master can service both networks. If, however, the master only has one radio transceiver, the master chooses to service one network based on network priority considerations. For example, in block 273, it may be desirable to service the slave because of the presence of data rather than monitor the premises network for HELLO messages from the base. On the other hand, in block 275, it may be more desirable to monitor the premises network for HELLO messages rather than transmit an idle sense message on the subnetwork.

Figure 13:
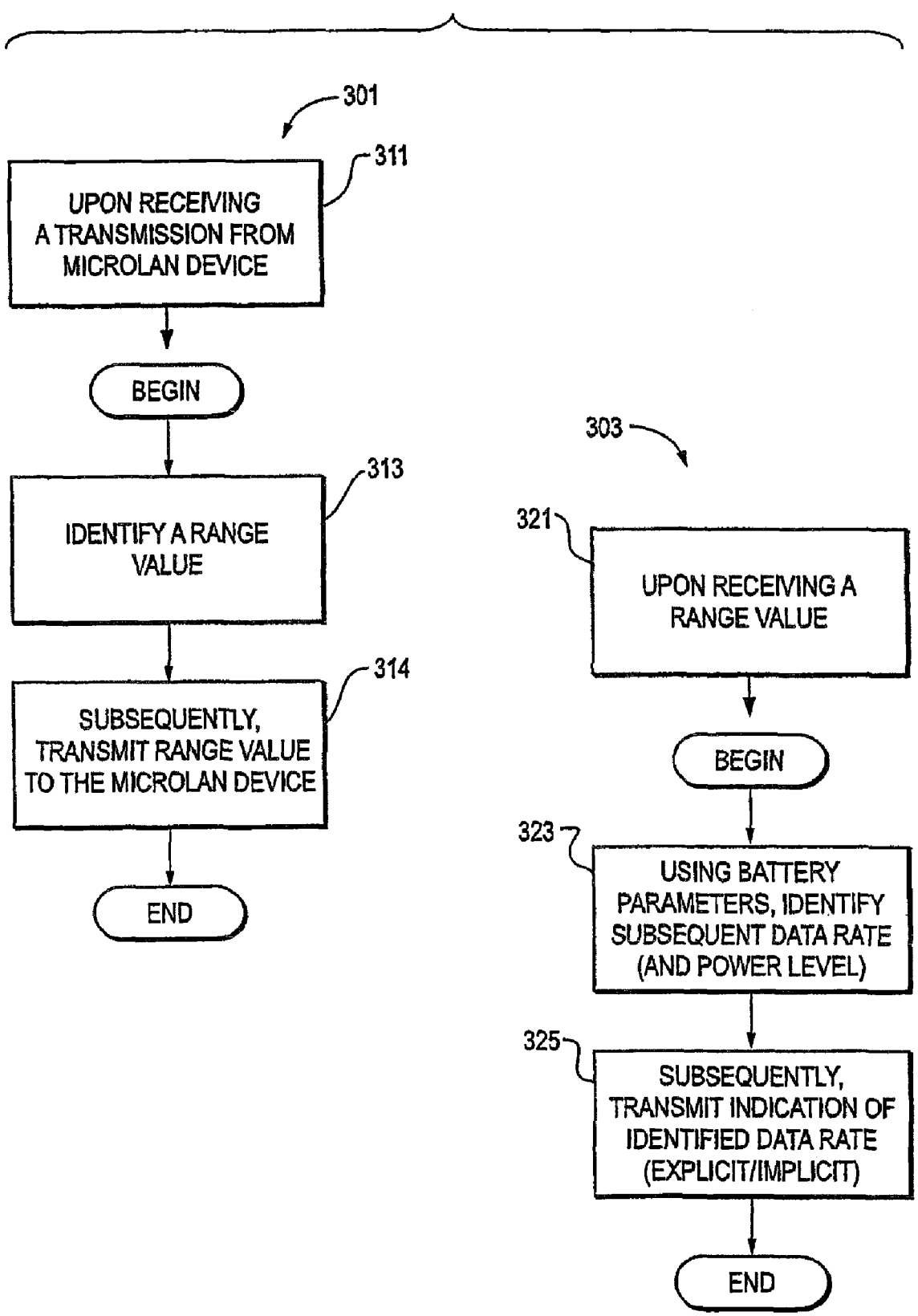
FIGS. 13 and 14 are block diagrams illustrating additional power saving features according to the present invention wherein ranging and battery parameters are used to optimally select the appropriate data rate and power level of subsequent transmissions.
Figure 14:
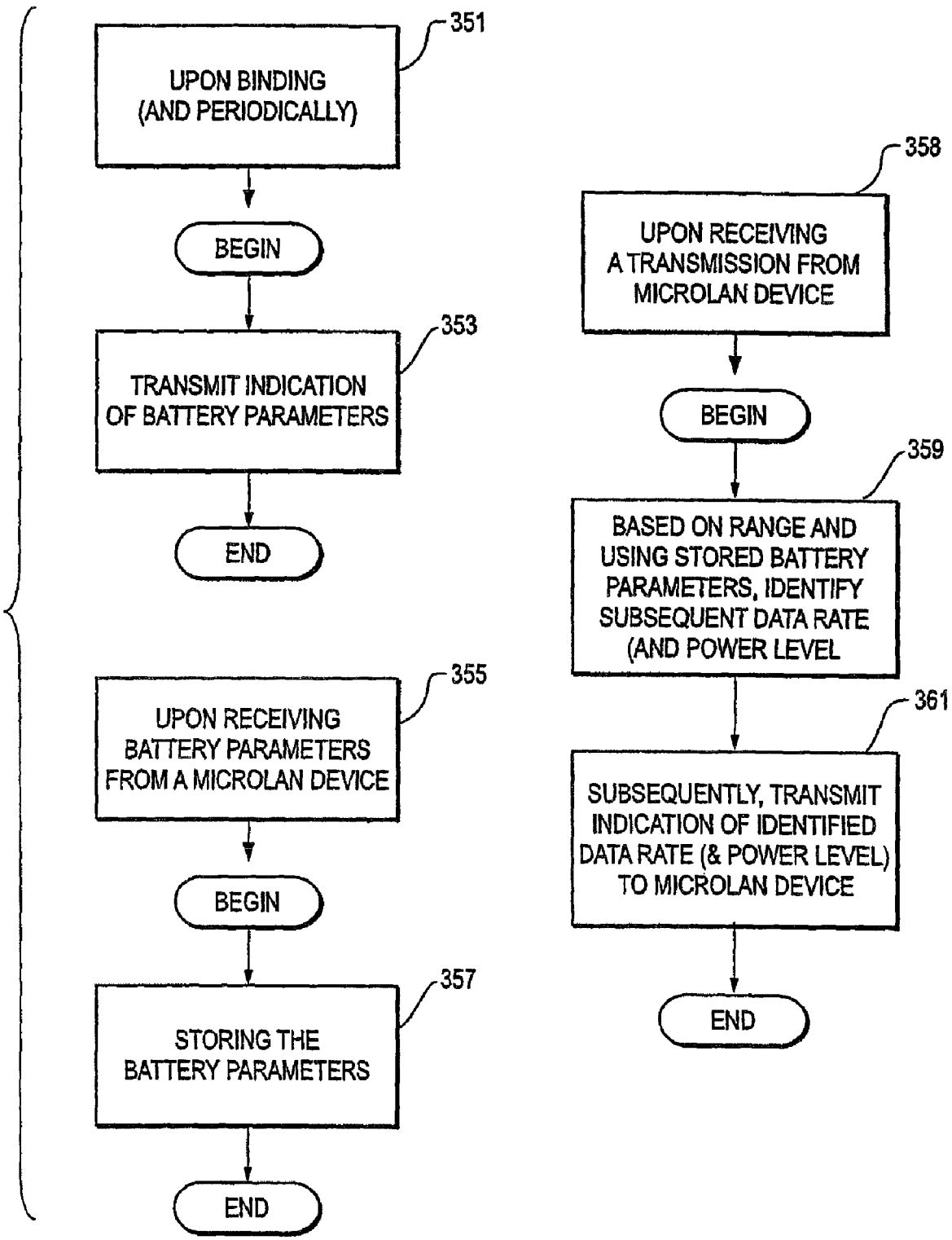

FIGS. 13 and 14 are block diagrams illustrating additional power saving features according to the present invention, wherein ranging and battery parameters are used to optimally select the appropriate data rate and power level for subsequent transmissions. Specifically, even though some network devices have the capability of performing high power transmissions, because of battery power concerns, the such devices are configured to utilize minimum transmission energy. Adjustments are made to transmission power level and data rate based on ranging information and on battery parameters. Similarly, within the peripheral LAN, even though lower power transceivers are used, battery conservation issues also justify the use such data rate and power adjustments. This process is described in more detail below in reference to FIGS. 13 and 14.

More specifically, FIG. 13 is a block diagram which illustrates a protocol 301 used by a destination peripheral LAN device and a corresponding protocol 303 used by a source peripheral LAN device to adjust the data rate and possibly the power level for future transmission between the two devices. At a block 311, upon receiving a transmission from a source device, the destination device identifies a range value at a block 313. In a low cost embodiment, the range value is identified by considering the received signal strength indications (RSSI) of the incoming transmission. Although RSSI circuitry might be placed in all peripheral LAN radios, the added expense may require that only peripheral LAN master devices receive the circuitry. This would mean that only peripheral LAN master devices would perform the function of the destination device. Other ranging values might also be calculated using more expensive techniques such as adding GPS (Global Position Service) circuitry to both radios. In such an embodiment, the range value transmitted at the block 313 would consist of the GPS position of the destination peripheral LAN device. Finally, after identifying the range value at the block 313, the destination device subsequently transmits the range value to the slave device from which the transmission was received.

Upon receipt of the range value from the destination device at a block 321, the source peripheral LAN device evaluates its battery parameters to identify a subsequent data rate for transmission at a block 323. If range value indicates that the destination peripheral LAN device is very near, the source peripheral LAN device selects a faster data rate. When the range value indicates a distant master, the source device selects a slower rate. In this way, even without adjusting the power level, the total energy dissipated can be controlled to utilize only that necessary to carry out the transmission. However, if constraints are placed on the maximum or minimum data rates, the transmission power may also need to be modified. For example, to further minimize the complexity associated with a fully random range of data rate values, a standard range and set of several data rates may be used. Under such a scenario, a transmission power adjustment might also need to supplement the data rate adjustment. Similarly, any adjustment of power must take into consideration maximum and minimum operable levels. Data rate adjustment may supplement such limitations. Any attempted modification of the power and data rate might take into consideration any available battery parameters such as those that might indicate a normal or current battery capacity, the drain on the battery under normal conditions and during transmission, or the fact that the battery is currently being charged. The latter parameter proves to be very significant in that when the battery is being charged, the peripheral LAN slave device, for example, has access to a much greater power source for transmission, which may justify the highest power transmission and possibly the slowest data rate under certain circumstances.

Finally, at a block 325, an indication of the identified data rate is transmitted back to the destination device so that future transmissions may take place at the newly selected rate. The indication of data rate may be explicit in that a message is transmitted designating the specific rate. Alternately, the data rate may be transferred implicitly in that the new rate is chose and used by the source, requiring the destination to adapt to the change. This might also be done using a predefined header for synchronization.

FIG. 14 illustrates an alternate embodiment for carrying out the data rate and possibly power level adjustment. At a block 351 upon binding and possibly periodically, the source peripheral LAN device sends an indication of its current battery parameters to the destination peripheral LAN device. This indication may be each of the parameters or may be an averaged indication of all of the parameters together. At a block 355, upon receipt, the destination peripheral LAN device 355 stores the battery parameters (or indication). Finally, at a block 358, upon receiving a transmission from the source device, based on range determinations and the stored battery parameters, the destination terminal identifies the subsequent data rate (and possibly power level). Thereafter, the new data rate and power level are communicated to the source device for either explicitly or implicitly for future transmissions.

Moreover, it will be apparent to one skilled in the art having read the foregoing that various modifications and variations of this communication system according to the present invention are possible and is intended to include all those which are covered by the appended claims.

What is claimed is:

1. A vehicle communication device comprising:
at least one transceiver operable to participate on a first wireless network, the at least one transceiver being further operable to participate on a second wireless network, wherein the second wireless network resides primarily within the vehicle and is a relatively shorter range wireless network relative to the first wireless network; and
a power interface configured to couple the vehicle communication device to receive power from a power supply of the vehicle.

2. The vehicle communication device of claim 1 wherein the first wireless network is a relatively longer range wireless network that resides primarily outside of the vehicle.

3. A vehicle communication device comprising:
at least one transceiver operable to participate on a first wireless network, the at least one transceiver being further operable to participate on a second wireless network, wherein the at least one transceiver is operable to provide wireless access for a second communication device, participating on the second wireless network, to the first wireless network; and
a power interface configured to couple the vehicle communication device to receive power from a power supply of the vehicle.

4. A vehicle communication device comprising:
at least one transceiver operable to participate on a first wireless network, the at least one transceiver being further operable to participate on a second wireless network, wherein the at least one transceiver is configured to participate on the first wireless network pursuant to a first communication protocol and on the second wireless network pursuant to a second communication protocol, and wherein the at least one transceiver is operable to resolve conflicts between the first communication protocol and second communication protocol; and
a power interface configured to couple the vehicle communication device to receive power from a power supply of the vehicle.

5. A vehicle communication device comprising:
at least one transceiver operable to participate on a first wireless network, the at least one transceiver being further operable to participate on a second wireless network, wherein the at least one transceiver is configured to participate as a slave device on the first wireless network and as a master device on the second wireless network; and
a power interface configured to couple the vehicle communication device to receive power from a power supply of the vehicle.

6. A vehicle communication device comprising:
at least one transceiver operable to participate on a first wireless network, the at least one transceiver being further operable to participate on a second wireless network, wherein the at least one transceiver is operable to communicate with a second communication device participating on the second wireless network, and wherein the second communication device is disposed on the vehicle; and
a power interface configured to couple the vehicle communication device to receive power from a power supply of the vehicle.

7. The vehicle communication device of claim 6 wherein the vehicle power supply supplies power to the second communication device.

8. The vehicle communication device of claim 1 wherein the at least one transceiver enters a state of low power consumption when not communicating with either the first wireless network or the second wireless network.

9. The vehicle communication device of claim 1 wherein the second wireless network is a peripheral subnetwork.

10. The vehicle communication device of claim 1 wherein the vehicle communication device is configured to couple to the vehicle in mounting relation therewith, thereby providing the vehicle communication device access to the power supply of the vehicle.

11. The vehicle communication device of claim 1 wherein the at least one transceiver conducts wireless communication at selected power levels.

12. A vehicle communication device comprising:
    at least one transceiver operable to participate on a first wireless network, the at least one transceiver being further operable to participate on a second wireless network, wherein the at least one transceiver wirelessly communicates using higher power transmissions when communicating on the first wireless network, and using lower power transmissions when communicating on the second wireless network; and
    a power interface configured to couple the vehicle communication device to receive power from a power supply of the vehicle.

13. A method for communicating within in a vehicle, the method comprising:
    providing a vehicle communication device having at least one transceiver operable to participate on a first wireless network, the at least one transceiver being further operable to participate on a second wireless network, wherein the second wireless network resides primarily within the vehicle and is a relatively shorter range wireless network relative to the first wireless network; and
    supplying power to the vehicle communication device from a power supply of the vehicle.

14. The method of claim 13 wherein the first wireless network is a relatively longer range wireless network that resides primarily outside of the vehicle.

15. A method for communicating within in a vehicle, the method comprising:
    providing a vehicle communication device having at least one transceiver operable to participate on a first wireless network, the at least one transceiver being further operable to participate on a second wireless network;
    providing wireless access for a second communication device, participating on the second wireless network, to the first wireless network; and
    supplying power to the vehicle communication device from a power supply of the vehicle.

16. A method for communicating within in a vehicle, the method comprising:
    providing a vehicle communication device having at least one transceiver operable to participate on a first wireless network, the at least one transceiver being further operable to participate on a second wireless network, wherein the at least one transceiver is configured to participate on the first wireless network pursuant to a first communication protocol and on the second wireless network pursuant to a second communication protocol;
    resolving conflicts between the first communication protocol and second communication protocol; and
    supplying power to the vehicle communication device from a power supply of the vehicle.

17. A method for communicating within in a vehicle, the method comprising:
    providing a vehicle communication device having at least one transceiver operable to participate on a first wireless network, the at least one transceiver being further operable to participate on a second wireless network, wherein the at least one transceiver is configured to participate as a slave device on the first wireless network and as a master device on the second wireless network; and
    supplying power to the vehicle communication device from a power supply of the vehicle.

18. A method for communicating within in a vehicle, the method comprising:
    providing a vehicle communication device having at least one transceiver operable to participate on a first wireless network, the at least one transceiver being further operable to participate on a second wireless network, wherein the at least one transceiver is operable to communicate with a second communication device participating on the second wireless network, and wherein the second communication device is disposed on the vehicle; and
    supplying power to the vehicle communication device from a power supply of the vehicle.

19. The method of claim 18 further comprising supplying power to the second communication device from the power supply of the vehicle.

20. The method of claim 13 wherein the at least one transceiver is operable to enter a state of low power consumption when not communicating with either the first wireless network or the second wireless network.

21. The method of claim 13 wherein the second wireless network is a peripheral subnetwork.

22. The method of claim 13 wherein supplying power to the vehicle communication device from a power supply of the vehicle comprises coupling the vehicle communication device to the vehicle in mounting relation therewith, thereby providing the vehicle communication device access to the power supply of the vehicle.

23. The method of claim 13 wherein the at least one transceiver conducts wireless communication at selected power levels.

24. A method for communicating within in a vehicle, the method comprising:
    providing a vehicle communication device having at least one transceiver operable to participate on a first wireless network, the at least one transceiver being further operable to participate on a second wireless network, wherein the at least one transceiver is configured to wirelessly communicate using higher power transmissions when communicating on the first wireless network, and using lower power transmissions when communicating on the second wireless network; and
    supplying power to the vehicle communication device from a power supply of the vehicle.

* * * * *